United States Patent
Crompton et al.

(10) Patent No.: US 9,857,006 B2
(45) Date of Patent: Jan. 2, 2018

(54) RETAINING RING FOR PIPE JOINT DEVICES

(71) Applicant: Quick Fitting, Inc., Warwick, RI (US)

(72) Inventors: David B. Crompton, Tiverton, RI (US); Libardo Ochoa Dias, West Warwick, RI (US); Herbert J. Bouchard, West Greenwich, RI (US)

(73) Assignee: Quick Fitting, Inc., Warwick, RI (US)

( * ) Notice: Subject to any disclaimer, the term of this patent is extended or adjusted under 35 U.S.C. 154(b) by 0 days.

(21) Appl. No.: 15/219,944

(22) Filed: Jul. 26, 2016

(65) Prior Publication Data

US 2017/0284574 A1 Oct. 5, 2017

Related U.S. Application Data

(60) Provisional application No. 62/316,114, filed on Mar. 31, 2016.

(51) Int. Cl.
*F16L 21/00* (2006.01)
*F16L 19/065* (2006.01)
*F16L 19/06* (2006.01)

(52) U.S. Cl.
CPC ........... *F16L 21/007* (2013.01); *F16L 19/061* (2013.01); *F16L 19/065* (2013.01)

(58) Field of Classification Search
CPC ...... F16L 21/007; F16L 19/061; F16L 19/065
USPC .......................................... 285/339, 342, 343
See application file for complete search history.

(56) References Cited

U.S. PATENT DOCUMENTS

| | | | |
|---|---|---|---|
| 1,822,056 A | 9/1931 | Noble | |
| 2,132,636 A | 10/1938 | Moohs | |
| 2,201,372 A | 5/1940 | Miller | |
| 2,230,098 A | 1/1941 | Wurzburger | |
| 2,351,363 A * | 6/1944 | Parker | F16L 19/10 285/334.4 |
| 2,398,618 A * | 4/1946 | Chavayda | F16L 19/12 285/342 |
| 2,450,527 A | 10/1948 | Bohn | |
| 2,456,203 A | 12/1948 | Loepsinger | |
| 2,458,874 A * | 1/1949 | Parker | F16L 37/0925 285/342 |

(Continued)

FOREIGN PATENT DOCUMENTS

| | | |
|---|---|---|
| CA | 2386574 | 3/2001 |
| CN | 104154363 | 11/2014 |

(Continued)

OTHER PUBLICATIONS

Cash ACME, Sharkbite(R) Push Fittings: A Connection System for Copper, CPVC or PEX pipe, Dec. 6, 2006. U.S.

*Primary Examiner* — David E Bochna
(74) *Attorney, Agent, or Firm* — Williams Mullen, PC; Thomas F. Bergert

(57) ABSTRACT

Embodiments of a retaining ring for a pipe joint assembly comprise a unitary, ring-shaped body having radially inner and outer surfaces and axially inner and outer surfaces, wherein the radially inner surface is provided with a gripping segment comprising one or more fins, with each of the fins extending radially inwardly. Embodiments further include a wing formed therewith, extending radially outwardly from the radial outer surface to the radially outermost surface. In various embodiments, the retaining ring can be split.

18 Claims, 17 Drawing Sheets

(56) References Cited

U.S. PATENT DOCUMENTS

| | | | |
|---|---|---|---|
| 2,473,118 A * | 6/1949 | Wolfram | F16L 19/10 285/342 |
| 2,490,620 A * | 12/1949 | Cole | F16L 19/045 285/343 |
| 2,529,821 A | 11/1950 | Snider | |
| 2,693,377 A * | 11/1954 | Wurzburger | F16L 19/10 285/343 |
| 2,774,616 A | 12/1956 | Dodd et al. | |
| 2,917,075 A | 12/1959 | Terry | |
| 3,060,959 A | 10/1962 | Clark | |
| 3,064,983 A | 11/1962 | Halterman | |
| 3,066,961 A | 12/1962 | Gerin | |
| 3,140,107 A | 7/1964 | Hynes | |
| 3,145,730 A | 8/1964 | Presnell | |
| 3,365,219 A | 1/1968 | Nicolaus | |
| 3,428,337 A | 2/1969 | Read | |
| 3,434,745 A | 3/1969 | Jackman | |
| 3,498,646 A * | 3/1970 | Depuy | F16L 19/12 285/343 |
| 3,679,241 A | 7/1972 | Hoffmann | |
| 3,709,526 A | 1/1973 | Cromie | |
| 3,805,824 A | 4/1974 | Robbins | |
| 3,821,670 A | 6/1974 | Thompson | |
| 3,830,532 A * | 8/1974 | Roberts | F16L 19/10 285/341 |
| 3,837,687 A | 9/1974 | Leonard | |
| 3,885,821 A | 5/1975 | Philibert | |
| 3,915,480 A | 10/1975 | Kish et al. | |
| 4,009,592 A | 3/1977 | Boerger | |
| 4,067,361 A | 1/1978 | Hollister et al. | |
| 4,083,586 A | 4/1978 | Helm | |
| 4,123,090 A | 10/1978 | Kotsakis et al. | |
| 4,135,745 A | 1/1979 | Dehar | |
| 4,146,254 A | 3/1979 | Turner et al. | |
| 4,178,023 A | 12/1979 | Guest | |
| 4,220,361 A | 9/1980 | Brandenberg | |
| 4,275,909 A | 6/1981 | Yoshizawa et al. | |
| 4,288,113 A | 9/1981 | Saulnier | |
| 4,305,606 A | 12/1981 | Legris | |
| 4,372,905 A | 2/1983 | Bohman | |
| 4,383,552 A | 5/1983 | Baker | |
| 4,437,493 A | 3/1984 | Okuda et al. | |
| 4,440,424 A | 4/1984 | Mode | |
| 4,466,640 A | 8/1984 | Van Houtte | |
| 4,480,729 A | 11/1984 | Porter | |
| 4,508,369 A | 4/1985 | Mode | |
| 4,568,114 A * | 2/1986 | Konrad | F16L 19/10 285/342 |
| 4,593,943 A | 6/1986 | Hama et al. | |
| 4,606,565 A | 8/1986 | Royston | |
| 4,613,172 A | 9/1986 | Schattmaier | |
| 4,630,848 A | 12/1986 | Twist et al. | |
| 4,637,636 A | 1/1987 | Guest | |
| 4,637,640 A | 1/1987 | Fournier et al. | |
| 4,645,246 A | 2/1987 | Guest | |
| 4,685,706 A | 8/1987 | Kowal et al. | |
| 4,712,810 A | 12/1987 | Pozzi | |
| 4,747,626 A | 5/1988 | Hama et al. | |
| 4,801,158 A | 1/1989 | Gomi | |
| 4,802,696 A | 2/1989 | Chohan et al. | |
| 4,867,198 A | 9/1989 | Faust | |
| 4,878,697 A | 11/1989 | Henry | |
| 4,878,698 A * | 11/1989 | Gilchrist | F16L 21/08 285/342 |
| 4,880,260 A | 11/1989 | Gotoh et al. | |
| 4,895,395 A | 1/1990 | Ceriani | |
| 4,919,457 A | 4/1990 | Moretti | |
| 5,010,740 A | 4/1991 | Backus et al. | |
| 5,024,468 A | 6/1991 | Burge | |
| 5,084,954 A | 2/1992 | Klinger | |
| 5,108,134 A | 4/1992 | Irwin | |
| 5,160,179 A | 11/1992 | Takagi | |
| 5,181,751 A | 1/1993 | Kitamura | |
| 5,230,539 A | 7/1993 | Olson | |
| 5,251,655 A | 10/1993 | Low | |
| 5,284,582 A | 2/1994 | Yang | |
| 5,292,157 A | 3/1994 | Rubichon | |
| 5,370,423 A | 12/1994 | Guest | |
| 5,425,347 A | 6/1995 | Zinke, III | |
| 5,443,289 A | 8/1995 | Guest | |
| 5,487,572 A | 1/1996 | Combot-Courrau et al. | |
| 5,524,936 A | 6/1996 | Barr et al. | |
| 5,577,530 A | 11/1996 | Condon | |
| 5,603,532 A | 2/1997 | Guest | |
| 5,711,550 A | 1/1998 | Brandt | |
| 5,722,696 A | 3/1998 | Taneya | |
| 5,769,462 A | 6/1998 | Angell | |
| 5,803,513 A * | 9/1998 | Richardson | F16L 21/08 285/342 |
| 5,887,911 A | 3/1999 | Kargula | |
| 5,911,443 A | 6/1999 | Le Quere | |
| 5,957,509 A * | 9/1999 | Komolrochanaporn | F16L 19/12 285/343 |
| 5,983,917 A | 11/1999 | Thomas | |
| 5,996,632 A | 12/1999 | Vogel et al. | |
| 6,012,743 A | 1/2000 | Godeau et al. | |
| 6,145,887 A | 11/2000 | Cambot-Courrau | |
| 6,145,893 A * | 11/2000 | Kuo | F16L 27/026 285/342 |
| 6,174,002 B1 | 1/2001 | Rho | |
| 6,250,686 B1 * | 6/2001 | Becker | B29C 65/342 285/342 |
| 6,264,250 B1 | 7/2001 | Teraoka et al. | |
| 6,343,814 B1 | 2/2002 | Bucher et al. | |
| 6,352,439 B1 | 3/2002 | Stark et al. | |
| 6,357,802 B1 | 3/2002 | Nozato et al. | |
| 6,427,309 B1 | 8/2002 | Viegener | |
| 6,447,019 B1 | 9/2002 | Hosono et al. | |
| 6,502,866 B1 | 1/2003 | Hujisawa et al. | |
| 6,505,860 B2 * | 1/2003 | Trichard | F16L 37/0925 285/343 |
| 6,517,124 B1 | 2/2003 | Le Quere | |
| 6,536,470 B1 | 3/2003 | Carn et al. | |
| 6,578,879 B2 | 6/2003 | Muto | |
| 6,612,623 B2 | 9/2003 | Salomon-Bahls | |
| 6,634,074 B2 | 10/2003 | Wild | |
| 6,685,230 B1 | 2/2004 | Bottura | |
| 6,764,102 B2 | 7/2004 | Ezura | |
| 6,805,385 B2 | 10/2004 | Viegener | |
| 6,824,172 B1 | 11/2004 | Komolrochanaporn | |
| 6,843,516 B2 | 1/2005 | Bishop et al. | |
| 6,869,109 B2 | 3/2005 | Matsushita | |
| 6,871,804 B2 | 3/2005 | Hagihara | |
| 6,979,026 B2 | 12/2005 | Kasahara et al. | |
| 6,988,509 B2 | 1/2006 | Frampton | |
| 6,988,746 B2 | 1/2006 | Olson | |
| 7,100,948 B2 | 9/2006 | Guest | |
| 7,178,836 B2 | 2/2007 | Hoff et al. | |
| 7,195,287 B2 | 3/2007 | Wai | |
| 7,273,235 B2 | 9/2007 | Coquard et al. | |
| 7,316,429 B2 | 1/2008 | Viegener | |
| 7,380,836 B2 | 6/2008 | Bogdanowicz et al. | |
| 7,445,247 B2 | 11/2008 | Ericksen et al. | |
| 7,448,654 B2 | 11/2008 | Le Quere | |
| 7,475,913 B2 | 1/2009 | Muto | |
| 7,509,971 B2 | 3/2009 | Kajuch | |
| 7,530,606 B1 | 5/2009 | Yang | |
| 7,549,679 B2 | 6/2009 | Brosius | |
| 7,621,569 B2 | 11/2009 | Anthoine | |
| 7,644,955 B1 | 1/2010 | Komolrochanaporn | |
| 7,686,346 B1 | 3/2010 | Buccicone et al. | |
| 7,823,932 B2 | 11/2010 | Webb et al. | |
| 7,850,208 B2 | 12/2010 | Greenberger | |
| 7,862,089 B2 | 1/2011 | Crompton | |
| 7,878,555 B2 | 2/2011 | Oh | |
| 7,914,050 B2 | 3/2011 | Udhofer et al. | |
| 7,942,161 B2 | 5/2011 | Crompton | |
| 7,954,861 B2 | 6/2011 | Swift et al. | |
| 8,118,331 B2 | 2/2012 | Yamashita et al. | |
| 8,205,915 B1 | 6/2012 | Crompton et al. | |
| 8,210,576 B2 | 7/2012 | Crompton | |
| 8,322,755 B2 | 12/2012 | Kluss et al. | |

(56) References Cited

U.S. PATENT DOCUMENTS

| | | |
|---|---|---|
| 8,398,122 B2 | 3/2013 | Crompton et al. |
| 8,439,404 B2 | 5/2013 | Anton et al. |
| 8,480,134 B2 | 7/2013 | Crompton et al. |
| 8,491,012 B2 | 7/2013 | LeQuere |
| 8,517,431 B2 | 8/2013 | Arning et al. |
| 8,585,100 B2 | 11/2013 | Stults et al. |
| 8,844,974 B1 | 9/2014 | Crompton et al. |
| 8,844,981 B1 | 9/2014 | Crompton et al. |
| 8,888,145 B1 | 11/2014 | Crompton et al. |
| 9,068,680 B1 | 6/2015 | Crompton et al. |
| 9,086,179 B1 | 7/2015 | Komolrochanaporn |
| 9,217,529 B2 | 12/2015 | Crompton et al. |
| 9,441,771 B2 * | 9/2016 | German ............... F16L 21/007 |
| 2003/0057701 A1 | 3/2003 | Koo |
| 2003/0067170 A1 | 4/2003 | Snyder et al. |
| 2004/0070198 A1 | 4/2004 | Rohrig |
| 2004/0245766 A1 | 12/2004 | Vallee |
| 2005/0194785 A1 | 9/2005 | Shemtov |
| 2006/0163870 A1 | 7/2006 | Goilot |
| 2006/0202478 A1 | 9/2006 | Guest |
| 2007/0075542 A1 | 4/2007 | Glaze et al. |
| 2008/0309081 A1 | 12/2008 | De Wilde |
| 2009/0021001 A1 | 1/2009 | Oh |
| 2009/0278346 A1 | 11/2009 | O'Brien |
| 2010/0253064 A1 | 10/2010 | LeQuere |
| 2011/0049875 A1 | 3/2011 | Stults et al. |
| 2011/0101685 A1 | 5/2011 | Lai |
| 2012/0001414 A1 | 1/2012 | Arning et al. |
| 2012/0200081 A1 | 8/2012 | Reznar et al. |
| 2012/0273709 A1 | 11/2012 | Zhang |
| 2014/0021717 A1 | 1/2014 | Burke et al. |
| 2014/0062078 A1 | 3/2014 | Weissmann |
| 2014/0265321 A1 | 9/2014 | DeCesare |
| 2015/0323112 A1 | 11/2015 | Wright |

FOREIGN PATENT DOCUMENTS

| | | |
|---|---|---|
| DE | 4304241 | 8/1994 |
| DE | 202012102342 | 11/2013 |
| EP | D272988 | 6/1988 |
| EP | D610538 | 2/1993 |
| EP | 1521027 | 4/2005 |
| EP | 2256394 | 12/2010 |
| EP | 2511583 | 10/2012 |
| GB | 2146400 | 4/1985 |
| GB | 2328259 | 2/1999 |
| JP | 2001032984 | 2/2001 |
| WO | 9939124 | 8/1999 |
| WO | 0079173 | 12/2000 |
| WO | 2013056273 | 4/2013 |

* cited by examiner

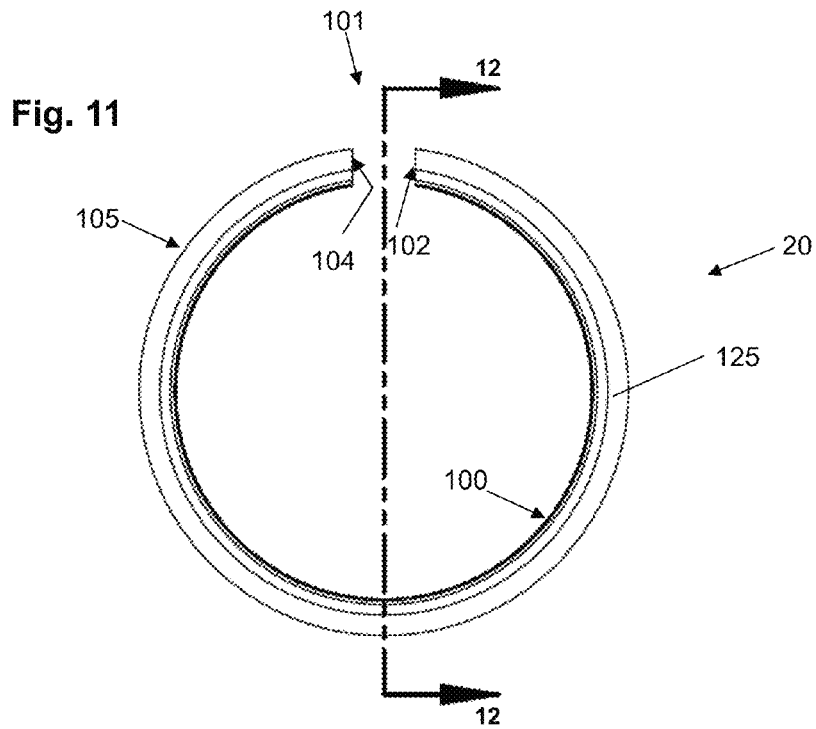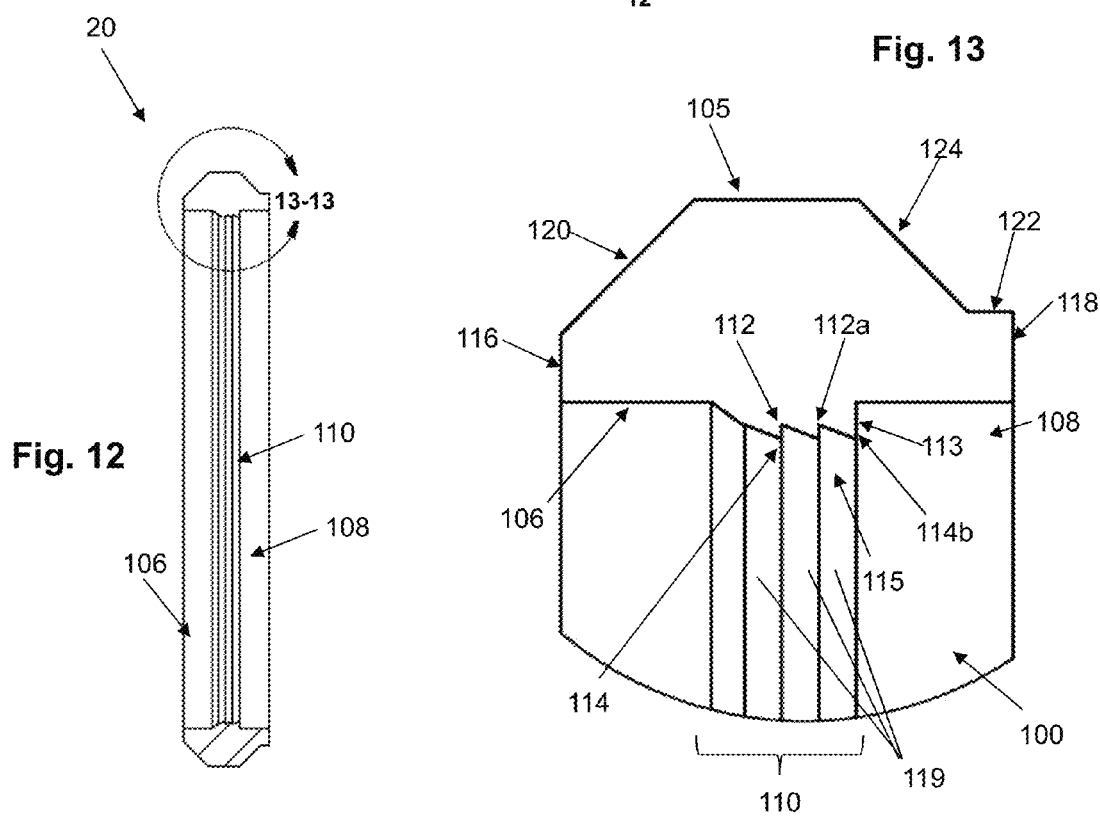

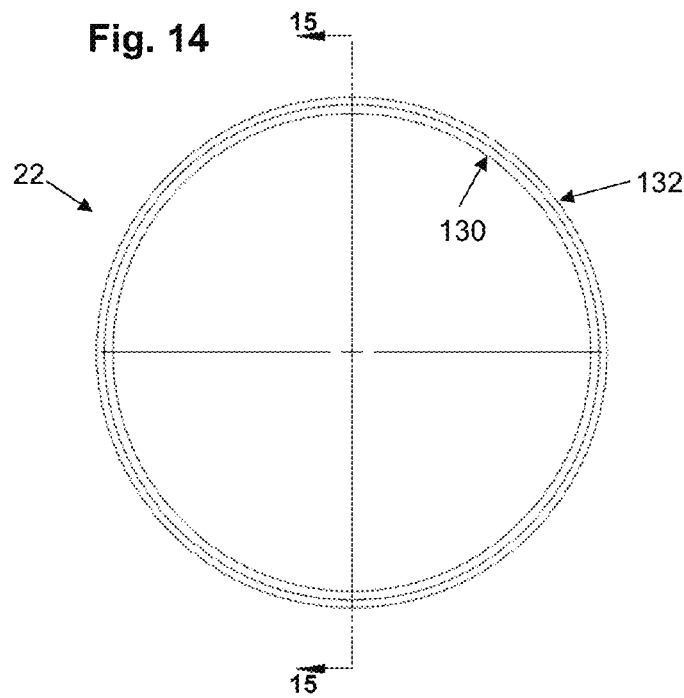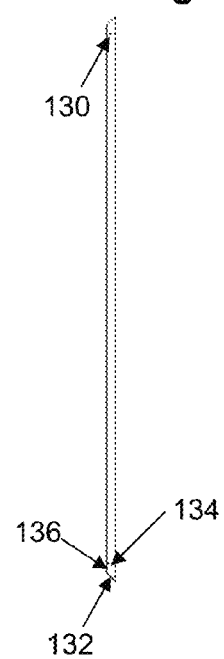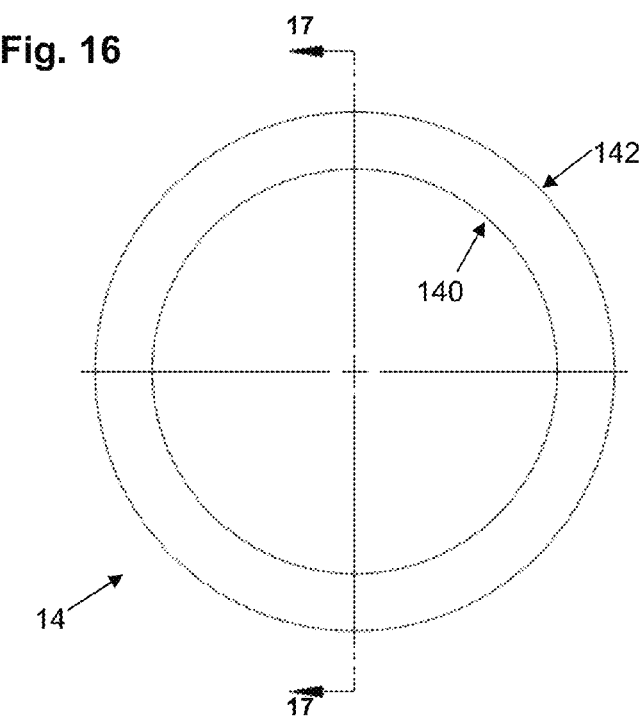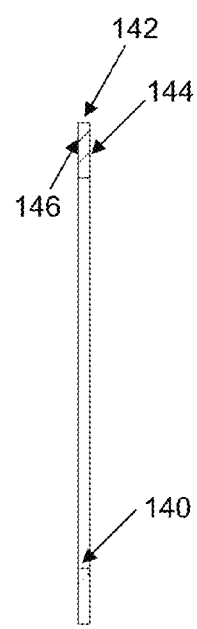
Fig. 14
Fig. 15
Fig. 16
Fig. 17

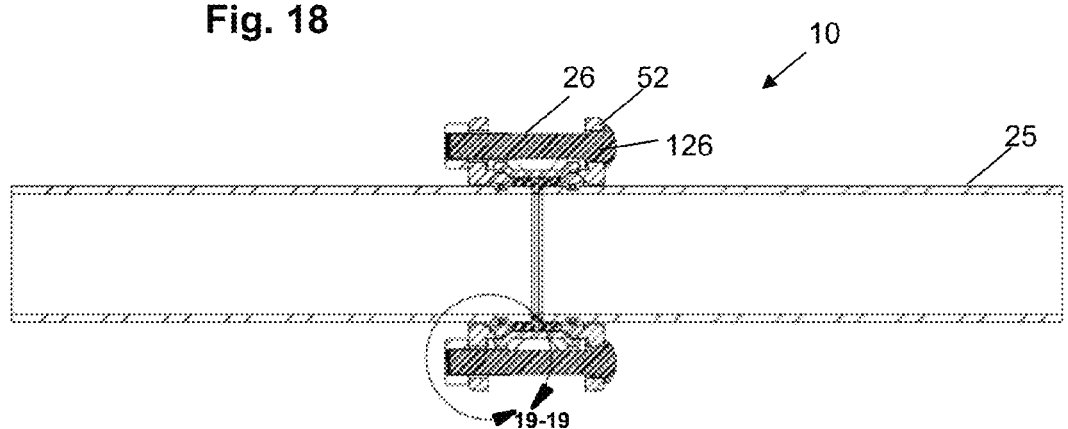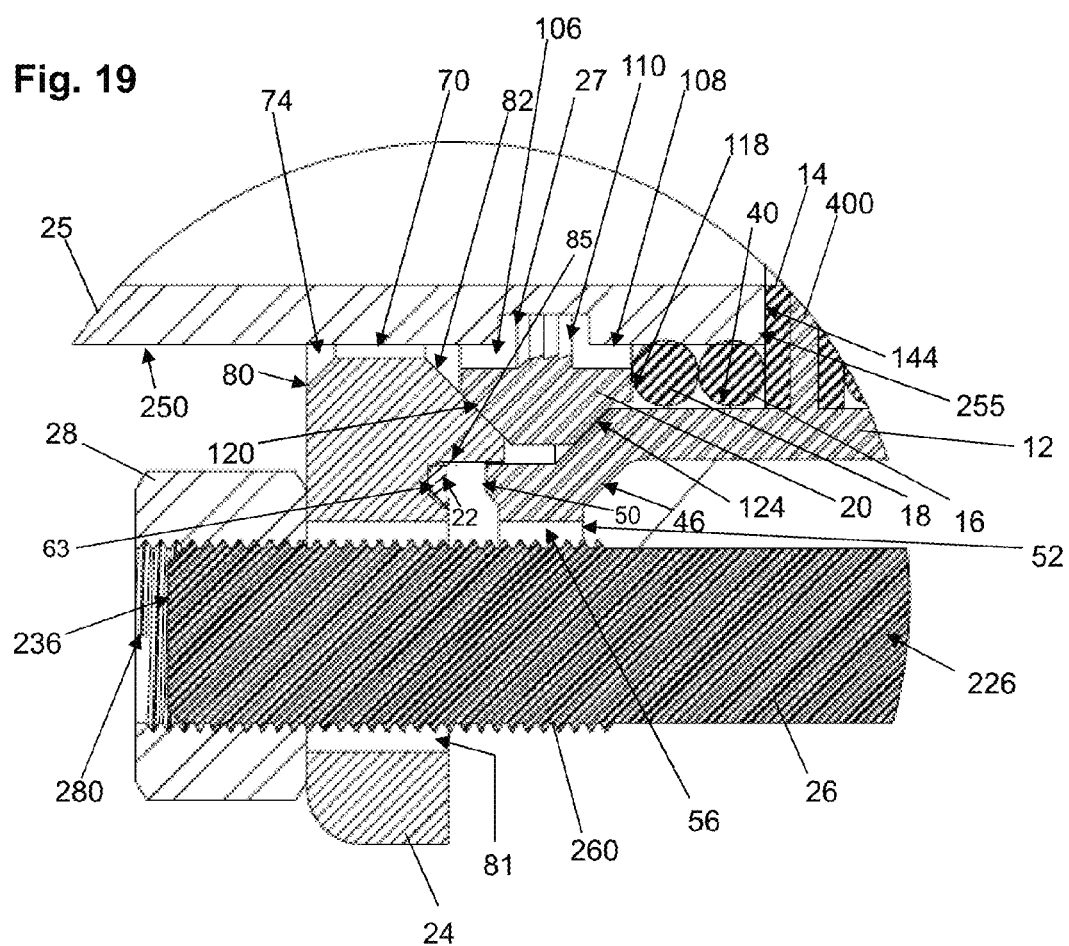

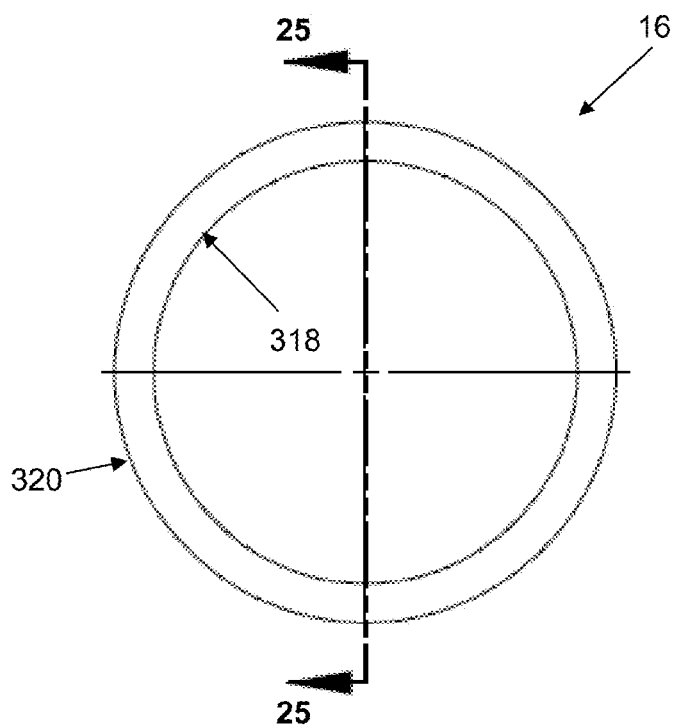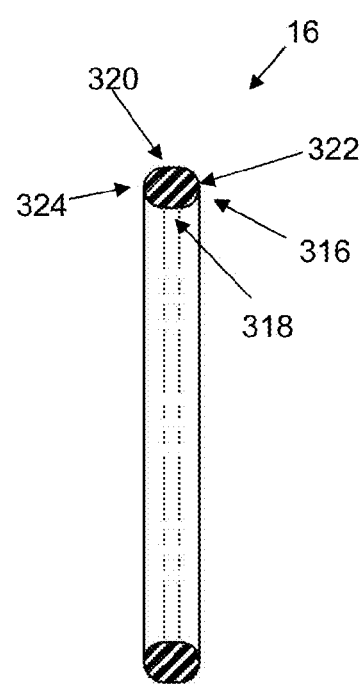

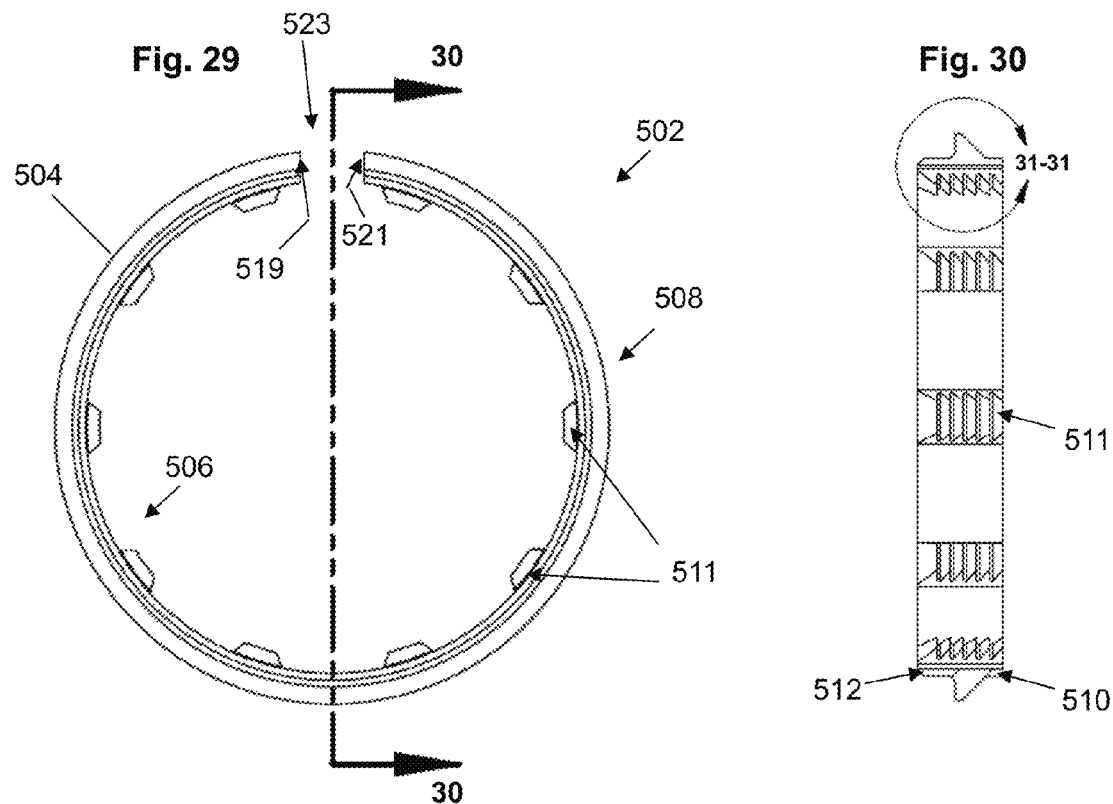
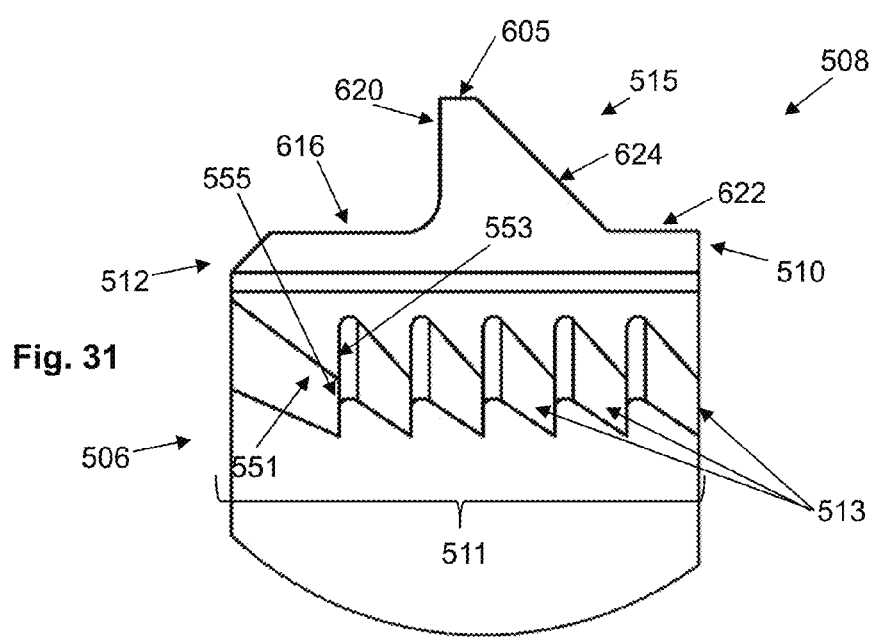

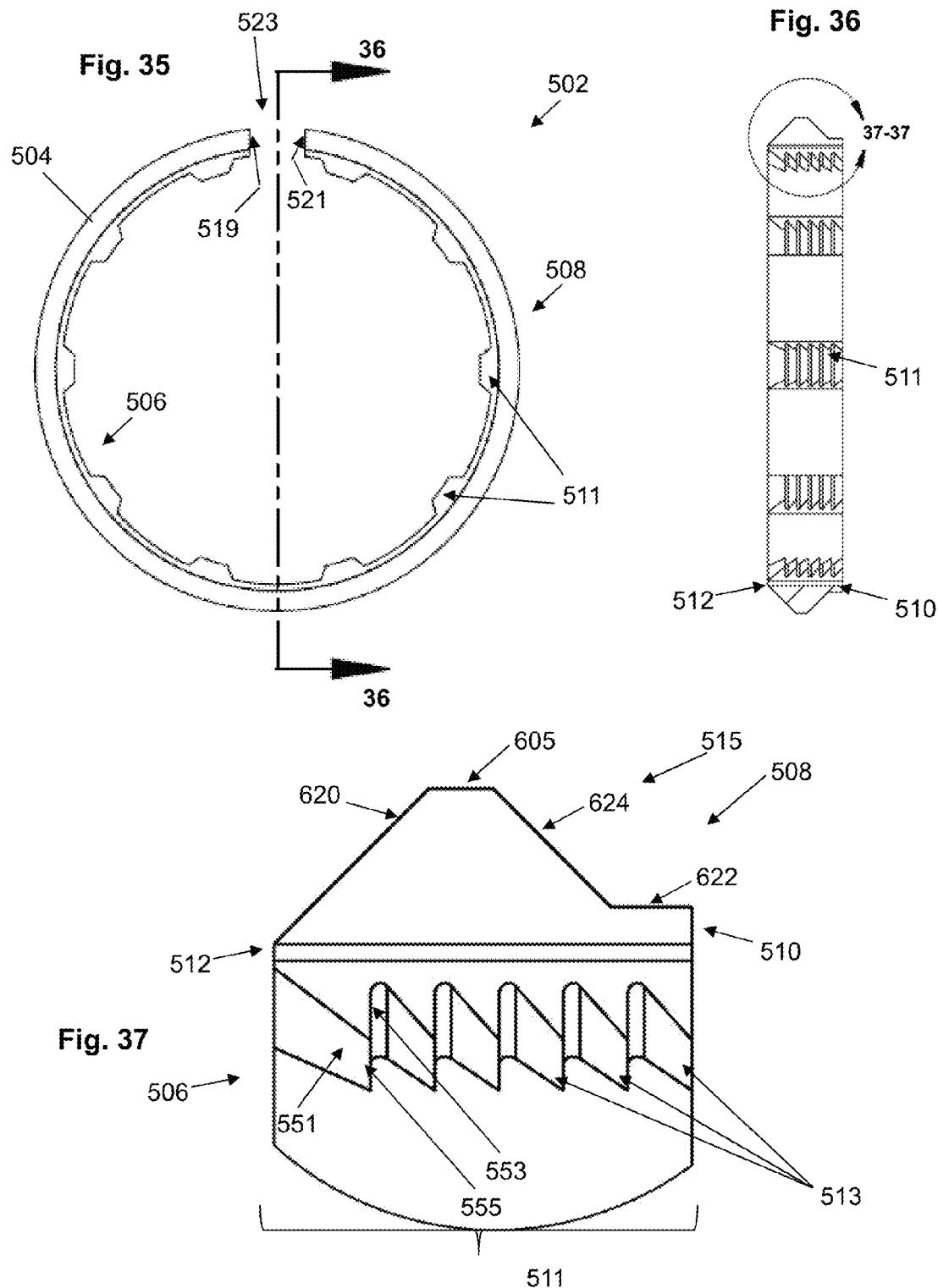

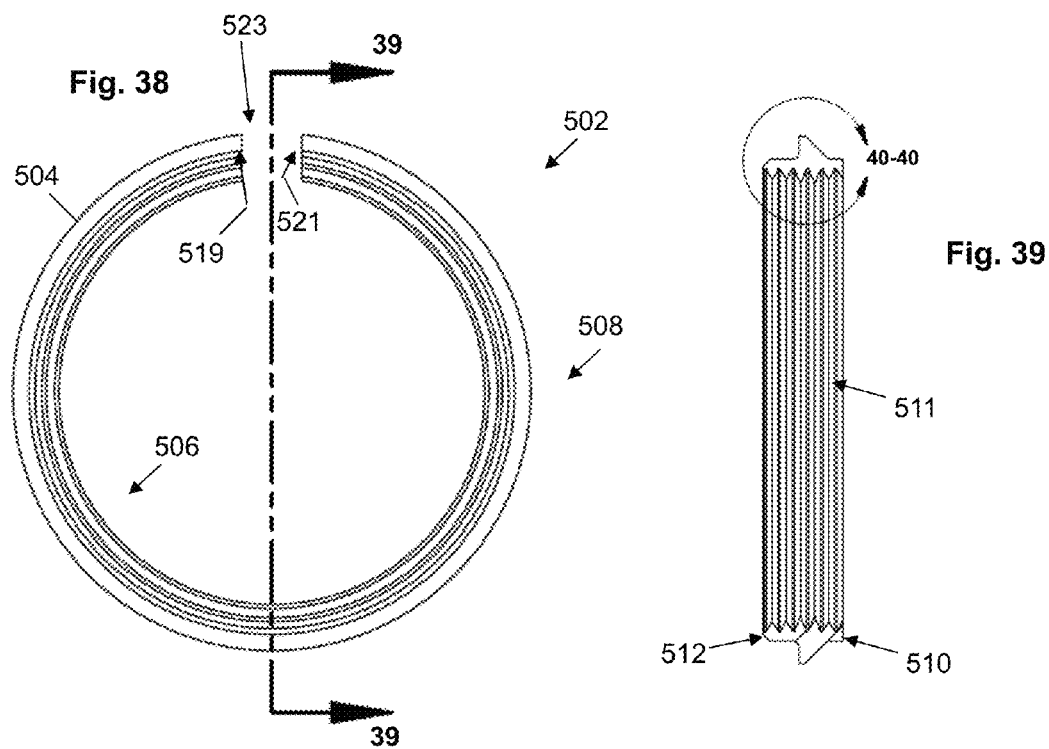
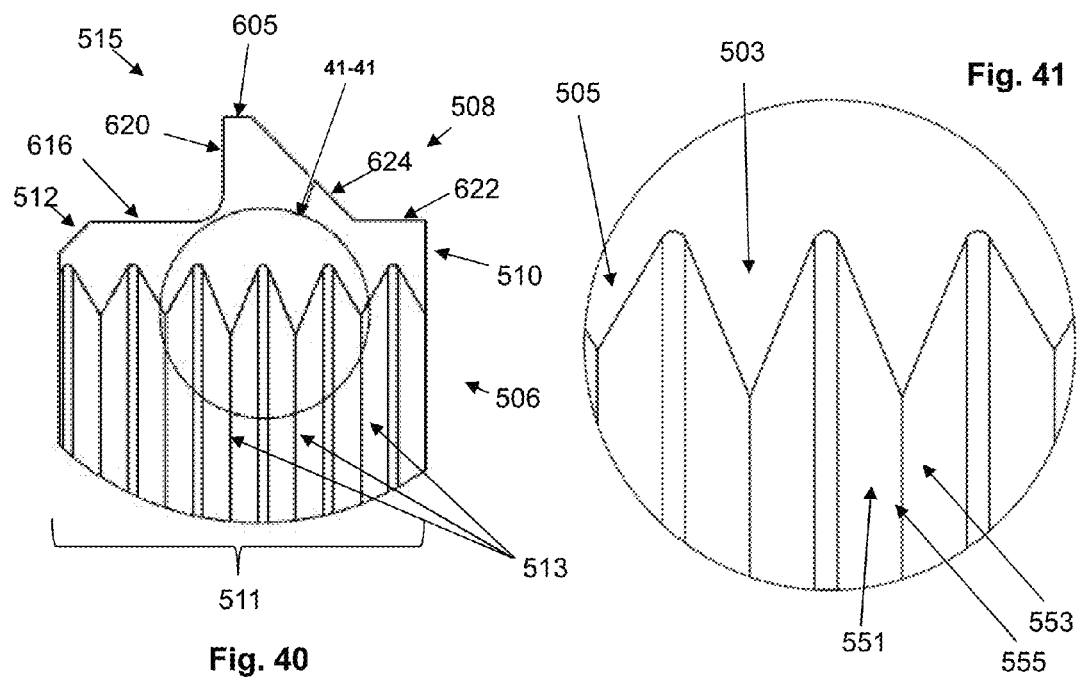

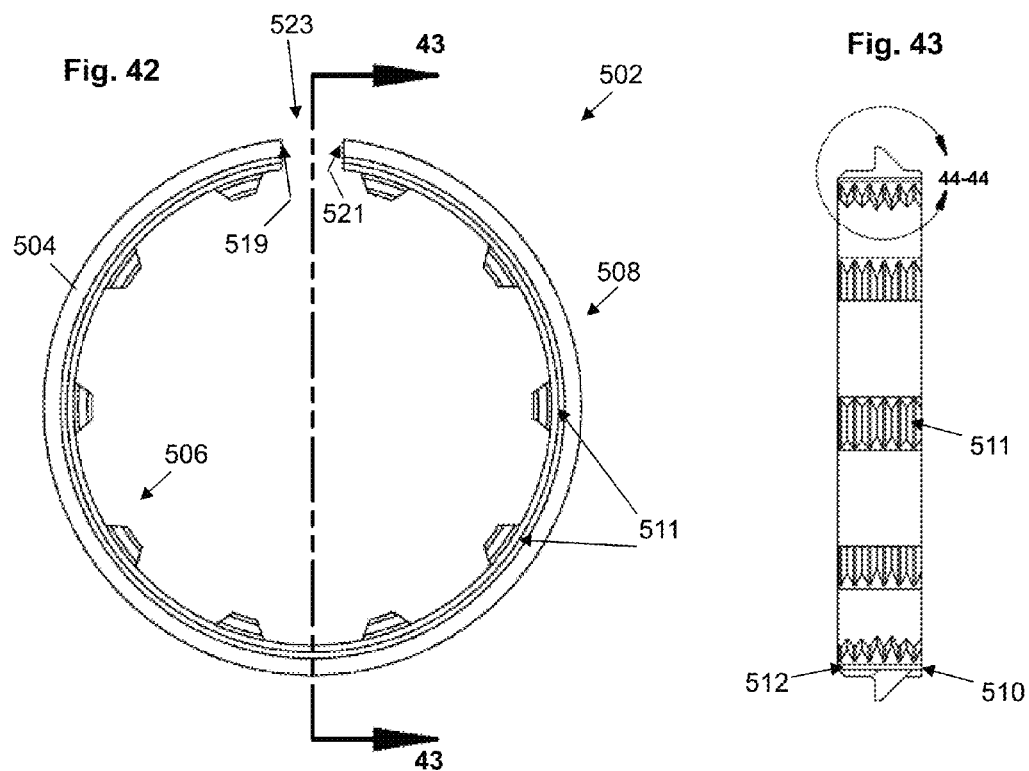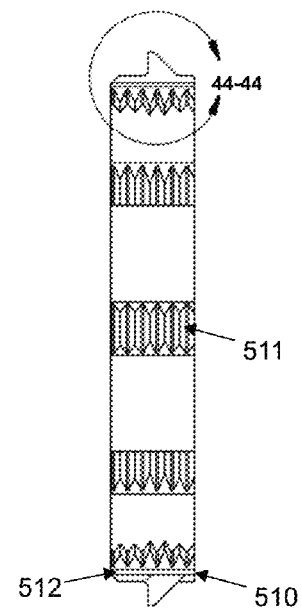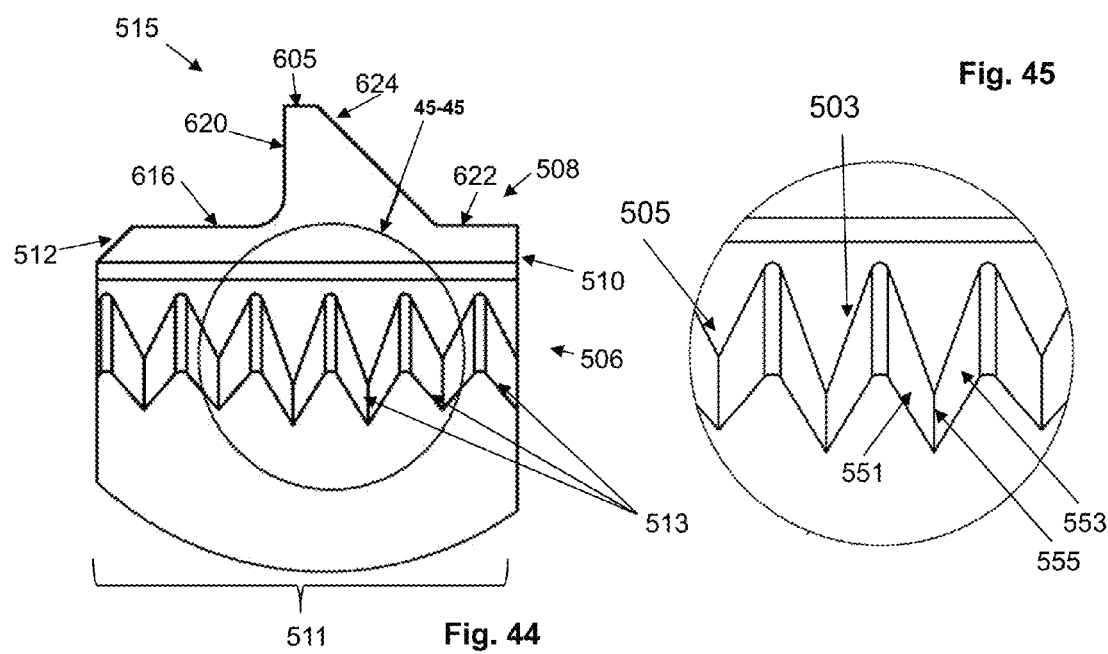

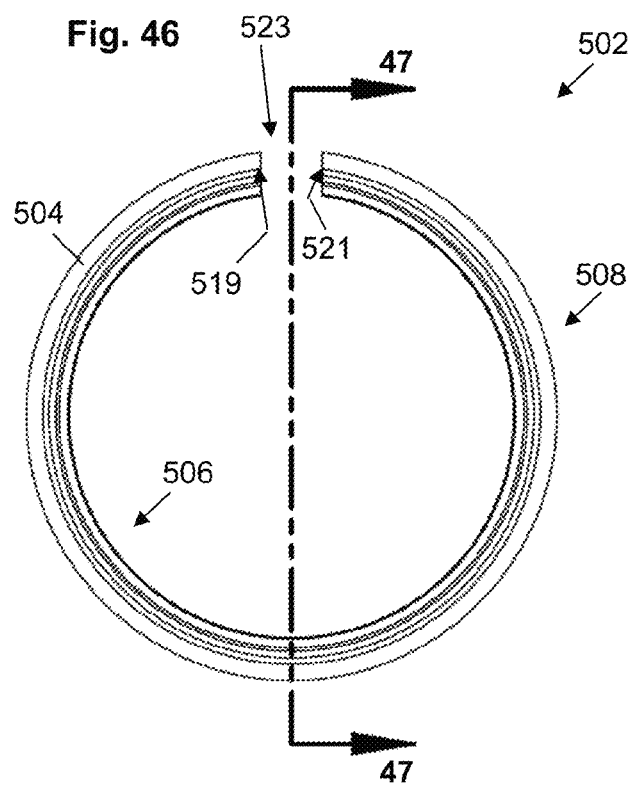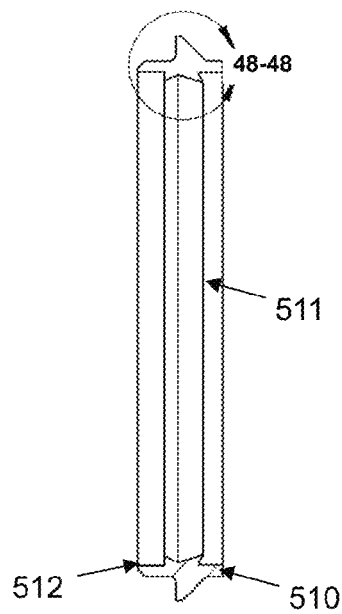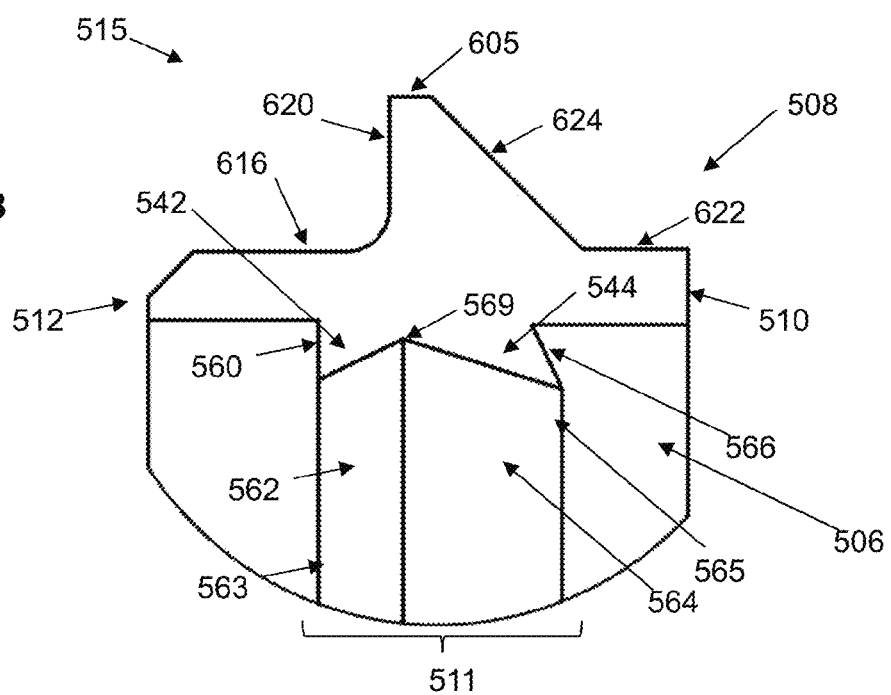

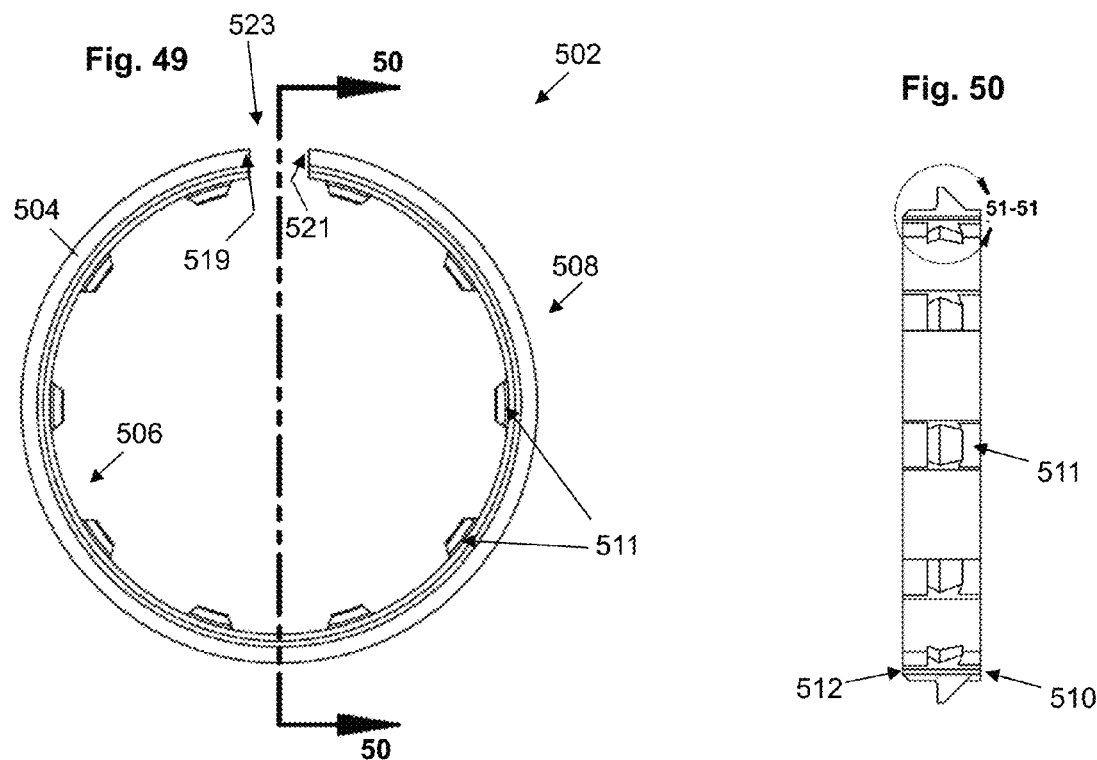
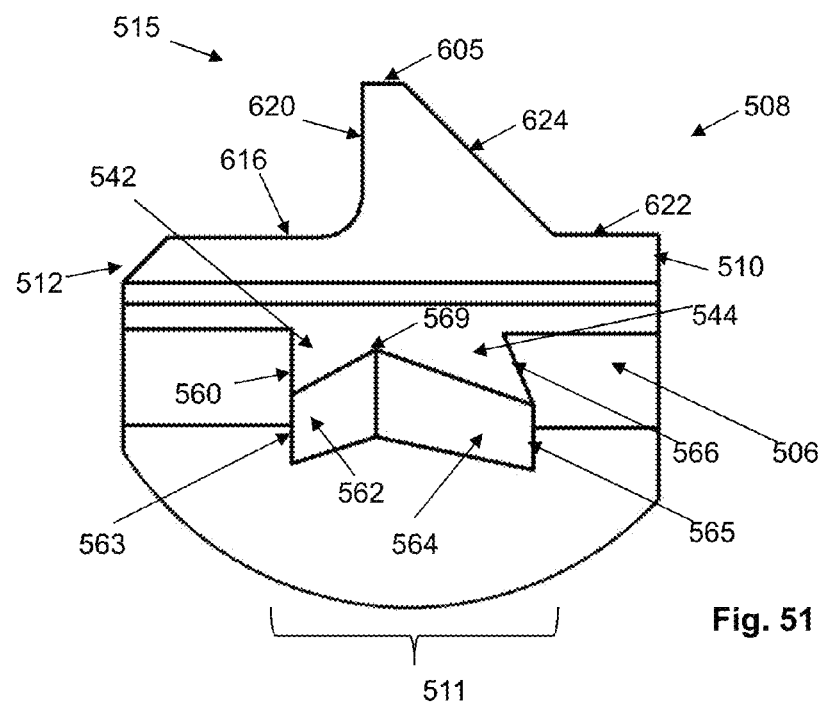

RETAINING RING FOR PIPE JOINT DEVICES

FIELD

The present disclosure relates generally to fluid flow systems, and more particularly to a retaining ring for joint devices adapted to receive piping elements.

BACKGROUND

Piping systems exist to facilitate the flow of fluids (e.g., liquid, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing/piping types can include, for example, copper, stainless steel, CPVC (chlorinated polyvinyl chloride), iron, black iron, ductile iron, gray iron, HDPE (high density polyethylene) and PEX (cross-linked polyethylene). For purposes of the present disclosure, the term "pipe" or "piping" will be understood to encompass one or more pipes, tubes, piping elements and/or tubing elements.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In recent years, push-fit technology has been employed with piping systems to reduce the dangers and time involved in soldering joints. Push-fit methods require minimal knowledge of pipe fitting and involve far fewer materials than soldering. For example, one may only need the pipes, quick-connect fittings, a chamfer/deburring tool and tubing cutter in order to connect pipes using push-fit technology.

The steps involved in connecting piping systems using push-fit technology can be outlined as follows. First, the pipe is cut to the appropriate length and the end of the pipe is cleaned with the deburring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection while creating a positive seal. Accordingly, no wrenches, clamping, gluing or soldering is involved. Push-fit and/or quick-connect technology for piping systems can be obtained, for example, through Quick Fitting, Inc. of Warwick, R.I., USA, suppliers of the CoPro®, ProBite®, LocJaw™, Blue-Hawk™, CopperHead® and Push Connect® lines of push fittings and related products. Also, such technology is described, for example, in U.S. Pat. No. 7,862,089, U.S. Pat. No. 7,942,161, U.S. Pat. No. 8,205,915, U.S. Pat. No. 8,210,576, U.S. Pat. No. 8,398,122, U.S. Pat. No. 8,480,134, U.S. Pat. No. 8,844,974, U.S. Pat. No. 8,844,981, U.S. Pat. No. 9,068,680, and U.S. Pat. No. 9,217,529, the disclosures of which are incorporated herein by reference in their entireties.

In some environments, it is desirable to provide zero and/or minimal resistance to a pipe being inserted into a joint arrangement. In such environments, an inserted pipe is generally provided with an annular groove nearest the end being inserted into the joint assembly, whereby the fastening ring can engage the groove and resist axial movement of the pipe.

SUMMARY

The present invention provides, in part, a retaining ring for pipe joint assemblies. The present invention assists with the connection of piping using no clamps, solder, glues, or special machining, while creating a leak-free seal at the connected joining area. Further, the present invention can assist with joining both like and unlike piping elements without coining or threading the elements into place.

BRIEF DESCRIPTION OF THE DRAWINGS

FIG. 11 is a right side view of a shoe gland according to embodiments of the present invention.

FIG. 12 is a cross-sectional view of the shoe gland taken along line 12-12 of FIG. 11.

FIG. 13 is an enlarged view of encircled portion 13-13 of FIG. 12.

FIG. 14 is a right side view of an indicator ring operable with embodiments of the present invention.

FIG. 15 is a cross-sectional view of the indicator ring taken along line 15-15 of FIG. 14.

FIG. 16 is a right side view of a sealing washer operable with embodiments of the present invention.

FIG. 17 is a cross-sectional view of the sealing washer taken along line 17-17 of FIG. 16.

FIG. 18 is a cross-sectional view of embodiments of a packing arrangement operable with embodiments of the present invention.

FIG. 19 is an enlarged view of encircled portion 19-19 of FIG. 18.

FIG. 24 is a right side view of an alternative sealing ring operable with embodiments of the present invention.

FIG. 25 is a cross-sectional view of the sealing ring taken along line 25-25 of FIG. 24.

FIG. 29 is a right side view of an alternative shoe gland retainer according to embodiments of the present invention.

FIG. 30 is a cross-sectional view of the shoe gland retainer taken along line 30-30 of FIG. 29.

FIG. 31 is an enlarged view of encircled portion 31-31 of FIG. 30.

FIG. 35 is a right side view of an alternative shoe gland retainer according to embodiments of the present invention.

FIG. 36 is a cross-sectional view of the shoe gland retainer taken along line 36-36 of FIG. 35.

FIG. 37 is an enlarged view of encircled portion 37-37 of FIG. 36.

FIG. 38 is a right side view of an alternative shoe gland retainer according to embodiments of the present invention.

FIG. 39 is a cross-sectional view of the shoe gland retainer taken along line 38-38 of FIG. 37.

FIG. 40 is an enlarged view of encircled portion 40-40 of FIG. 39.

FIG. 41 is an enlarged view of encircled portion 41-41 of FIG. 40.

FIG. 42 is a right side view of an alternative shoe gland retainer according to embodiments of the present invention.

FIG. 43 is a cross-sectional view of the shoe gland retainer taken along line 43-43 of FIG. 42.

FIG. 44 is an enlarged view of encircled portion 44-44 of FIG. 43.

FIG. 45 is an enlarged view of encircled portion 45-45 of FIG. 44.

FIG. 46 is a right side view of an alternative shoe gland retainer according to embodiments of the present invention.

FIG. 47 is a cross-sectional view of the shoe gland retainer taken along line 27-27 of FIG. 26.

FIG. 48 is an enlarged view of encircled portion 28-28 of FIG. 27.

FIG. 49 is a right side view of an alternative shoe gland retainer according to embodiments of the present invention.

FIG. 50 is a cross-sectional view of the shoe gland retainer taken along line 27-27 of FIG. 26.

FIG. 51 is an enlarged view of encircled portion 28-28 of FIG. 27.

DETAILED DESCRIPTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

As shown in FIGS. 1 through 51, embodiments of the present invention can be employed by a variety of pipe joint assemblies, and in particular assemblies that facilitate connection and disconnection of piping elements with zero resistance.

Figure 1:
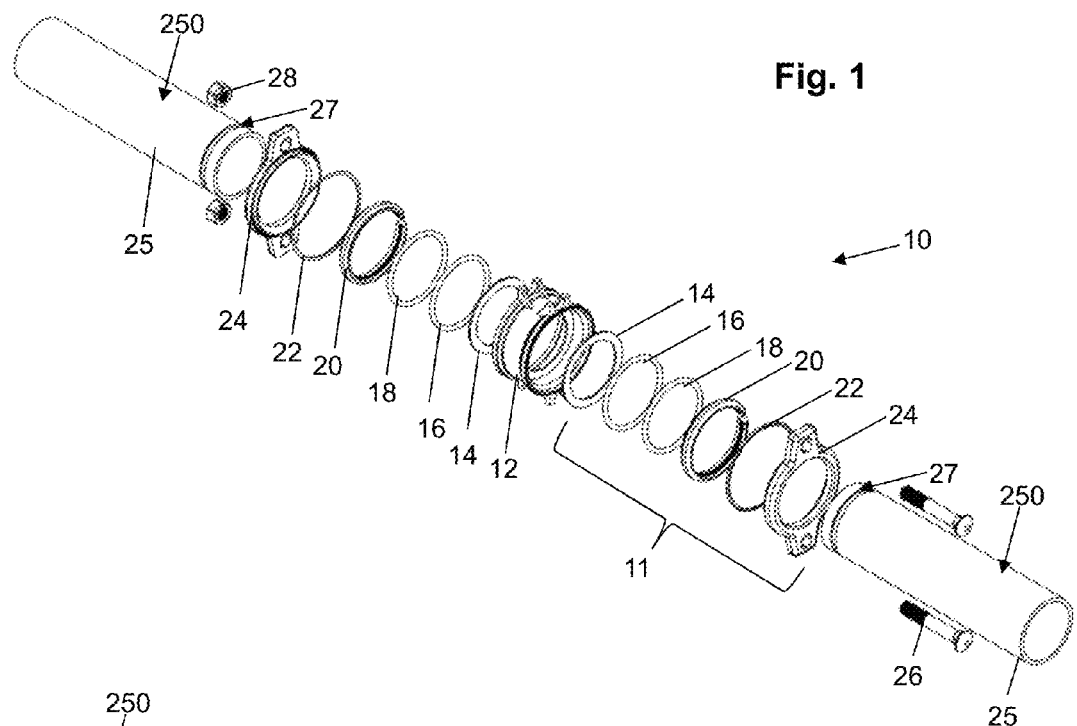
FIG. 1 shows an exploded perspective view of a device adapted to employ embodiments of the present invention.
Figure 2:
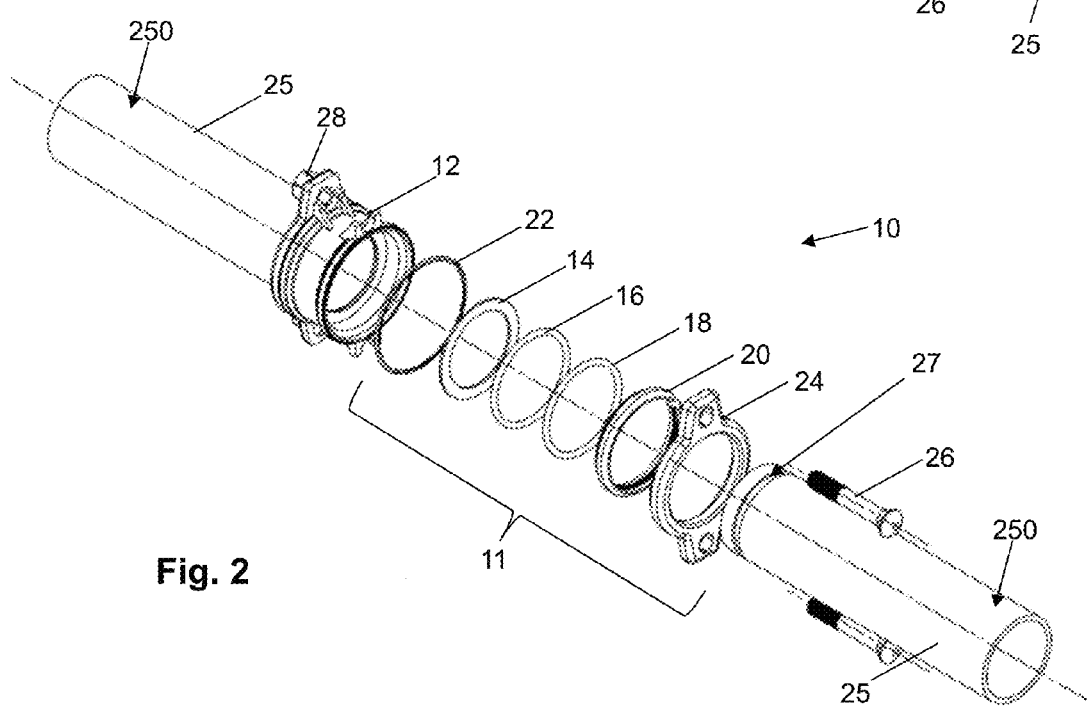
FIG. 2 is an exploded perspective view similar to FIG. 1, with one tubing element and packing arrangement installed.
Figure 3:
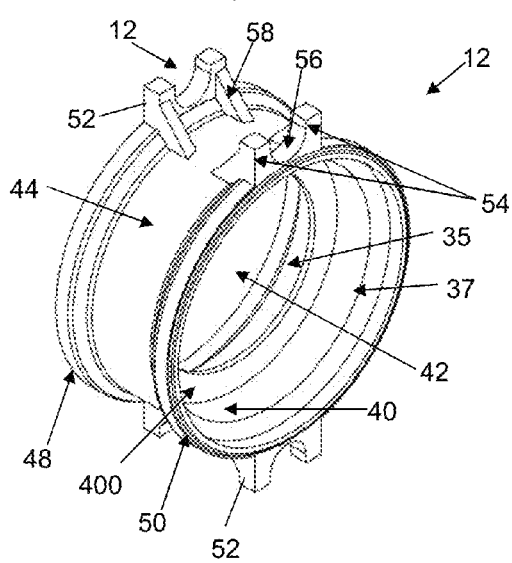
FIG. 3 shows a perspective view of a center body connector operable with embodiments of the present invention.
Figure 4:
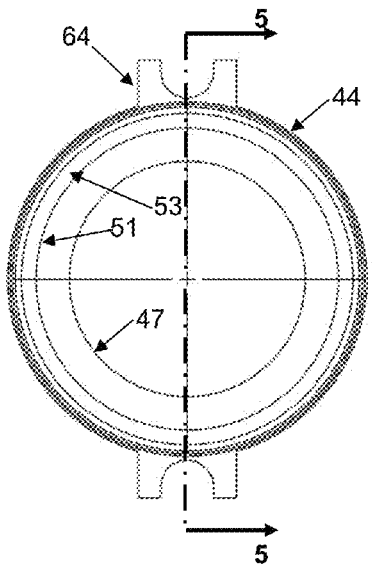
FIG. 4 shows a right side view of the center body connector of FIG. 3.

As shown, for example, in FIGS. 1 and 2, embodiments of a device 10 include a center body connector 12 and a packing arrangement 11 that, when combined yet not tightened, form a cavity for the zero resistance insertion of one or more piping or tubing elements 25 as shown. Once a pipe 25 is inserted, the packing arrangement 11 can be tightened against the body connector 12 to provide a leak-free seal. In various embodiments, an indicator ring 22 is provided that extends outwardly of the outer surface 44 of the center body connector 12 and the joined retaining cap 24 (see FIG. 23) to provide a visual indicator that sufficient connective pressure has been applied for the seal to operate properly. When compressed, the indicator ring 22 is adapted to protrude radially outwardly beyond and adjacent the axial end wall segment 50 and/or 150 of the center body connector 12. The indicator ring 22 can comprise a membrane of low density rubber that is flexible, resilient and displaceable under pressure in various embodiments, and can be of a special distinctive color to facilitate visual inspection as described elsewhere herein.

In various embodiments, as shown in FIGS. 1 through 23, the packing arrangement 11 can include one or more of the following components: a center body connector 12, one or more sealing members, such as sealing rings 16, 18 and/or a flat sealing washer or gasket 14, a shoe gland 20, an indicator ring 22 and a retaining cap 24. The piping element(s) 25 can include an annular groove and/or notch ring 27, or may be grooveless. In various embodiments, no fastening rings or grip rings are employed. In various embodiments, the shoe gland 20 is a split gland, as shown in FIG. 11, for example. The sealing rings 16, 18 can be substantially ring-shaped and having a substantially circular body cross-section. In various embodiments, as shown in FIGS. 24 and 25, for example, sealing ring 16 can be provided with an oblong cross-sectional shape, as indicated at 316, with radially outer 318 and inner 316 walls that extend axially a distance that is greater than the distance in which axially inner 322 and outer 324 walls extend radially. While FIGS. 24 and 25 show an embodiment of sealing ring 16, separate sealing ring 18 can have the same structure as sealing ring 16 shown therein. In various embodiments, sealing rings 16, 18 have an internal diameter that is greater than the external diameter of an inserted pipe 25, such that there is no resistance to the insertion of the pipe through the rings 16, 18. However, after the pipe is inserted and the bolt and nut are tightened together as described elsewhere herein, the sealing rings 16, 18 compress and create a tight seal around the inserted pipe. In various embodiments, sealing element 14 has an internal diameter that is the same as diameter of the center flange 400 of the center body connector 12. In other words, the radial distance R1 (see FIG. 5) from the central axis A of the center body connector 12 to the radial inner surface 41 of the flange is the same as the radial distance from the central axis A to the inner surface 140 of sealing member 14 when installed. In this way, sealing ring 14 provides a face seal for the axial end wall 255 of an inserted pipe or tube 25, as shown in FIG. 19. Sealing rings 14, 16, 18 can be formed of rubber or similarly flexible material.

As shown in FIGS. 3 through 6, the center body connector 12 includes first 35 and a second 37 pipe receiving portions on either side of a radially inwardly extending center flange 400. The center body connector 12 includes a radially outer surface 44, first 50 and second 150 axial end wall segments, and a radially interior surface 40 forming a cavity 42 extending axially through the body connector along an axis A. The inner flange 400 is integrally formed with and is part of the center body connector 12, and includes radially extending side wall surfaces (e.g., 43, 45) and an axially extending radially inner surface 41. Each of side wall surfaces 43, 45 acts as a tube stop for stopping inserted tubes and/or pipes (e.g., pipe 25). The inner flange 400 extends radially inwardly from the interior surface 40 at the axially inner portion 47 of center body connector 12.

Figure 5:
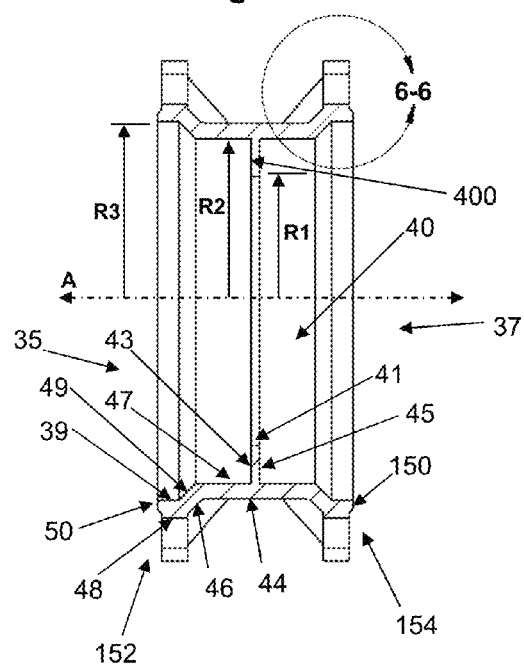
FIG. 5 shows a cross-sectional view of the center body connector taken along line 5-5 of FIG. 4.

As shown in FIG. 5, flange 400 extends radially inwardly towards the center body connector axis A, resulting in an internal radius from the longitudinal axis A to the tube stop flange radially inner surface 41 of R1. In some embodiments, R1 is substantially equivalent to the internal radius of the piping element(s) 25 being connected, thereby enabling a seamless connection between the pipe(s) 25 from the perspective of fluids, etc., traveling within pipe(s) 25. In various embodiments, the center body connector 12 can be formed (e.g., forged, cast, extruded, pressed) in brass, aluminum, steel, malleable iron, plastic or copper, for example, with full porting and full flow. Such forming can be by hydroforming, hydro-molding, compression forming, vacuum forming, pressure forming, tube forming, die casting, sand casting, investment casting, wax casting and other established forming methods, for example. Forming can be an alternative method to metal die stamping, for example.

In various embodiments, as shown in FIGS. 3 through 6, the interior radius of the pipe receiving portions 35, 37 may vary at different points along the longitudinal axis A of center body connector 12. This varying radius facilitates the receipt of different parts in, for example, packing arrangement 11. More specifically, as shown for example in FIG. 5, axially outer portion 39 of interior surface 40 is associated with a radius R3, and axially inner portion 47 is associated with a radius R2. In various embodiments, interior surface 40 includes a sloped portion 49 of varying radius between the axially outer portion 39 and the axially inner portion 47. With such form, the interior surface 40 is adapted to engage the sealing rings (e.g., 14, 16, 18), the shoe 20 and the retaining cap 24 during operation as described elsewhere herein. The outer wall 44 of center body connector 12 includes an axially outer segment 48 corresponding to outer portion 39 of the interior surface 40, and an angled axial mid-segment 46 corresponding to sloped portion 49 of the interior surface 40.

Figure 6:
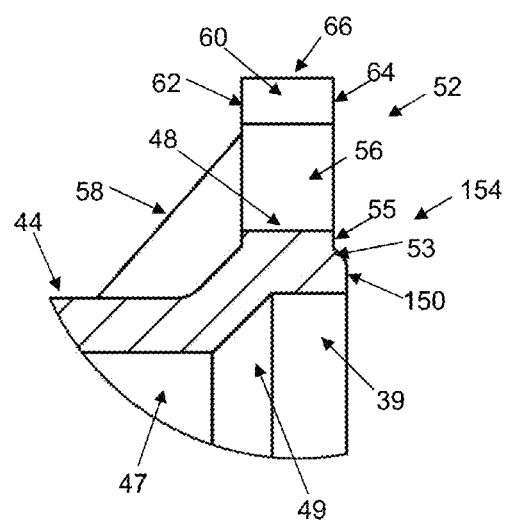
FIG. 6 shows an enlarged view of encircled portion 6-6 of FIG. 5.

As further shown in FIGS. 3 through 6, one or more outer blocks or flanges 52 are provided, each of which is integrally formed with and is part of the center body connector 12, and extends radially outwardly from the outer surface 44 of center body connector 12. In various embodiments, the blocks 52 extend from the axially outer portions 152, 154 of center body connector 12. In various embodiments, the blocks do not extend from the axial end wall surfaces 50, 150, but rather extend from a point axially inward from the axial end wall segments 50, 150. For example, as shown in FIG. 6, block 52 extends from radially extending edge 55 of the axially outer portion 154 of the center body connector 12. The radially extending edge 55 is integrally formed with a beveled wall segment 53 and the axial end wall segment 150, and these elements 55, 53, 150 assist in providing an indicator engaging surface when packing arrangement 11 is employed. As further shown in FIG. 6, block 52 includes an axial outer end wall surface 64, an axial inner face 62, an axial top face 66, and a support wall 58 extending from the inner face 62 to the outer surface 44 of the center body connector 12. Block 52 also includes a substantially semicircular shaped interior surface 56 extending to a radially outwardly extending segment 60 that provides a substantially U-shaped guide or opening to facilitate snug receipt of a bolt member body as described elsewhere herein. In various embodiments, a pair of substantially parallel blocks 52 is provided at multiple positions along the outer surface 44 of the center body connector 12. This facilitates a balanced engagement of the elements of the packing arrangement 11 within connector 12.

Figure 7:
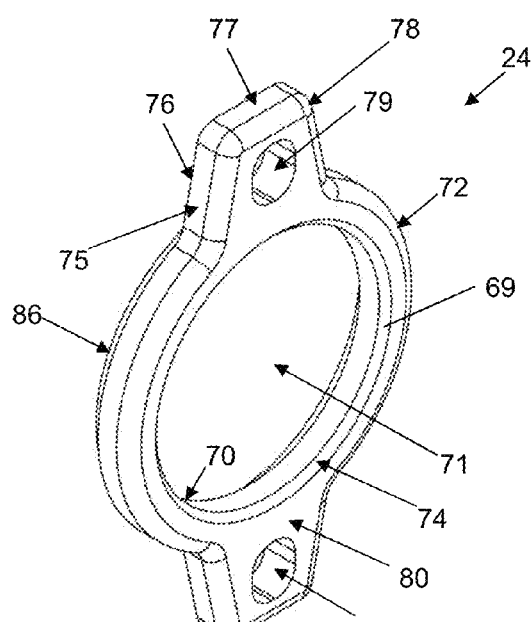
FIG. 7 is a perspective view of a retaining cap operable with embodiments of the present invention.
Figure 8:
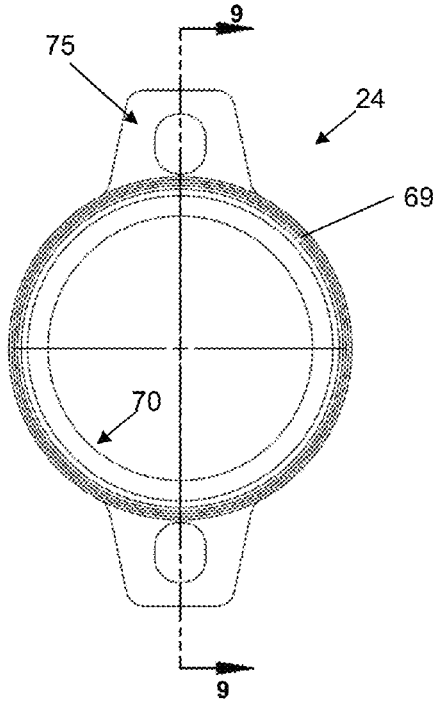
FIG. 8 is a right side view of the retaining cap of FIG. 7.

As shown in FIGS. 7 through 10, the retaining cap 24 is provided with a substantially ring-shaped body 69 with an inner surface 70 forming an opening 71 extending axially therethrough. The cap 24 further has one or more bolt retaining blocks 75 extending radially outwardly of the body 69 and integrally formed with the body 69 so as to provide a monolithic structure. Each bolt retaining block 75 includes a front face 80, back face 67, side walls 76, 78, radial outer face 77 and radial inner face 70. An opening 81 extends through each block 75 from front face 80 to back face 67, with an interior wall 79 defining the outer boundaries of opening 81 and adapted to receive a bolt 26. In various embodiments, the blocks 75 and respective openings 81 are positioned about the circumference of the retaining cap body 69 so as to align with blocks 52 and surfaces 56 of center body connector 12 when installed. The openings 81 can be of various shapes and sizes, and as shown in FIGS. 7 and 8, the openings 81 are substantially oval in shape. Further, the bolt retaining blocks 75 can be configured to extend sufficiently far above the retaining cap body 69 such that there is enough clearance for the bolt head.

Figure 9:
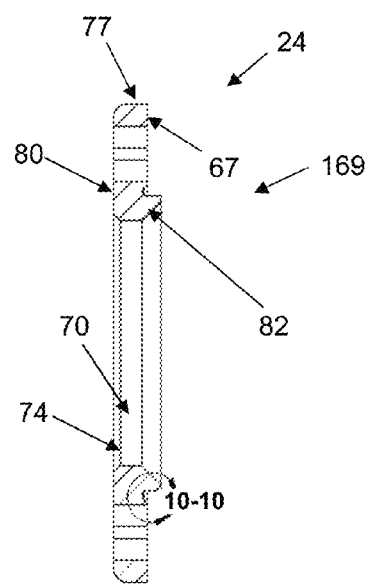
FIG. 9 is a cross-sectional view of the retaining cap taken along line 9-9 of FIG. 8.
Figure 10:
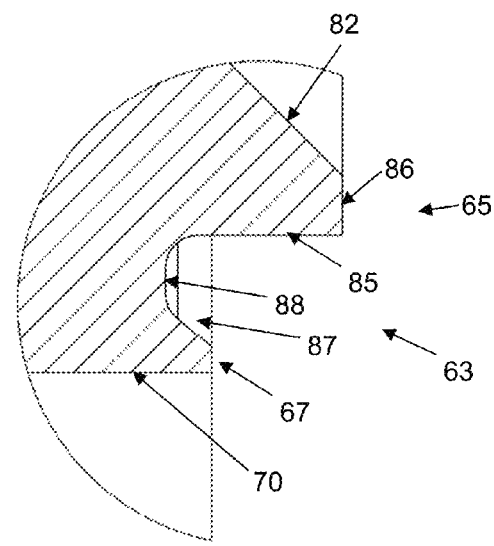
FIG. 10 is an enlarged view of encircled portion 10-10 of FIG. 9.
Figure 20:
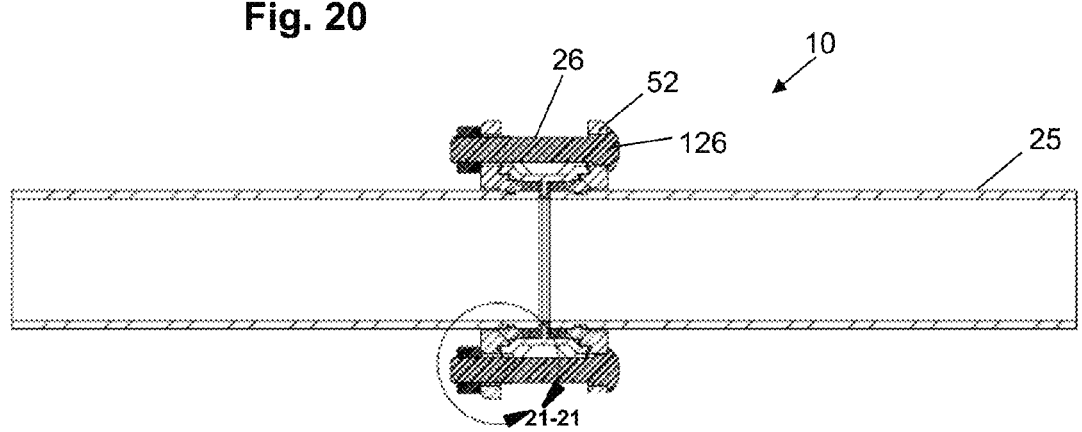
FIG. 20 is a cross-sectional view similar to FIG. 18, with the packing arrangement tightened further than shown in FIG. 18 through engagement of the nut and bolt pairs.

As further shown in FIGS. 7, 9 and 10, the retaining cap front face 80 can include a beveled edge 74 leading to inner surface 70 at or near opening 71 to facilitate receipt of an inserted pipe 25 during operation. In some embodiments, the radial distance to inner surface 70 is substantially equivalent to the internal radius of the piping element(s) 25 being connected, thereby enabling a seamless connection between the pipe(s) 25 from the perspective of fluids, etc., traveling within pipe(s) 25. Additionally, the body 69 is formed with an axially inner portion 169 including a back face 67, wherein the axially inner portion 169 can be formed with a notch 63 and ledge 65 to facilitate engagement with the center body connector 12 and indicator ring 22 when assembled and tightened, as described elsewhere herein. As shown in FIGS. 9 and 10, the notch 63 includes a first segment 87 extending radially and axially inwardly from face 67 to a curved notch segment 88, which extends to a radially inner segment 85 of the ledge 65. Segment 85 extends axially outwardly to axially outer segment 86 of the ledge 65. Axially outer segment 86 extends radially outwardly to shoe engaging wall 82, which extends radially and axially inwardly toward inner face 70.

In various embodiments, and similar to the center body connector 12, the retaining cap 24 can be forged or formed in brass, aluminum, steel, malleable iron, copper, other metallic material or non-metallic material, for example. As shown in FIGS. 18 through 23, the retaining cap 24 is aligned with the center body connector 12 even in the uncompressed position, and does not require rotation or threaded connection with another part in order to install a piping element. Various surfaces of the retaining cap provide structure to support interoperation, connection and engaged movement with other surfaces of other components of the present invention, as shown and described herein.

Figure 21:
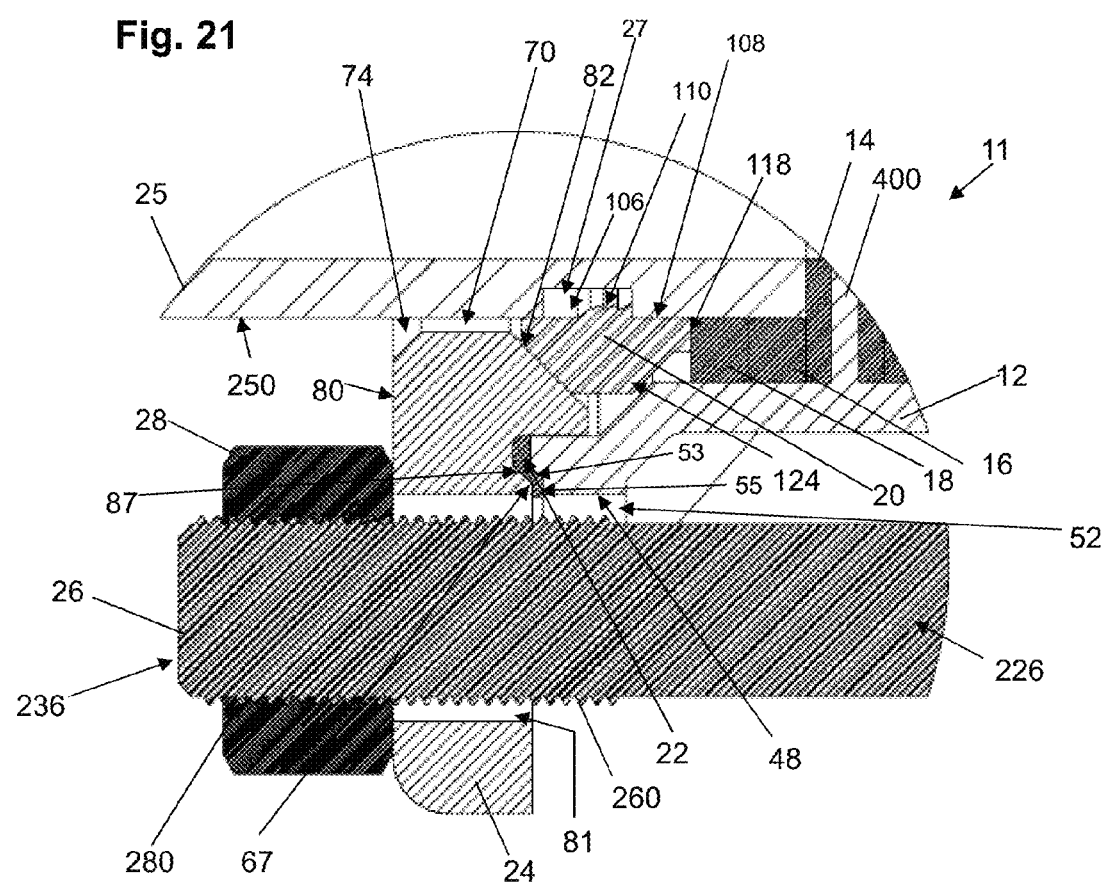
FIG. 21 is an enlarged view of encircled portion 21-21 of FIG. 20.
Figure 22:
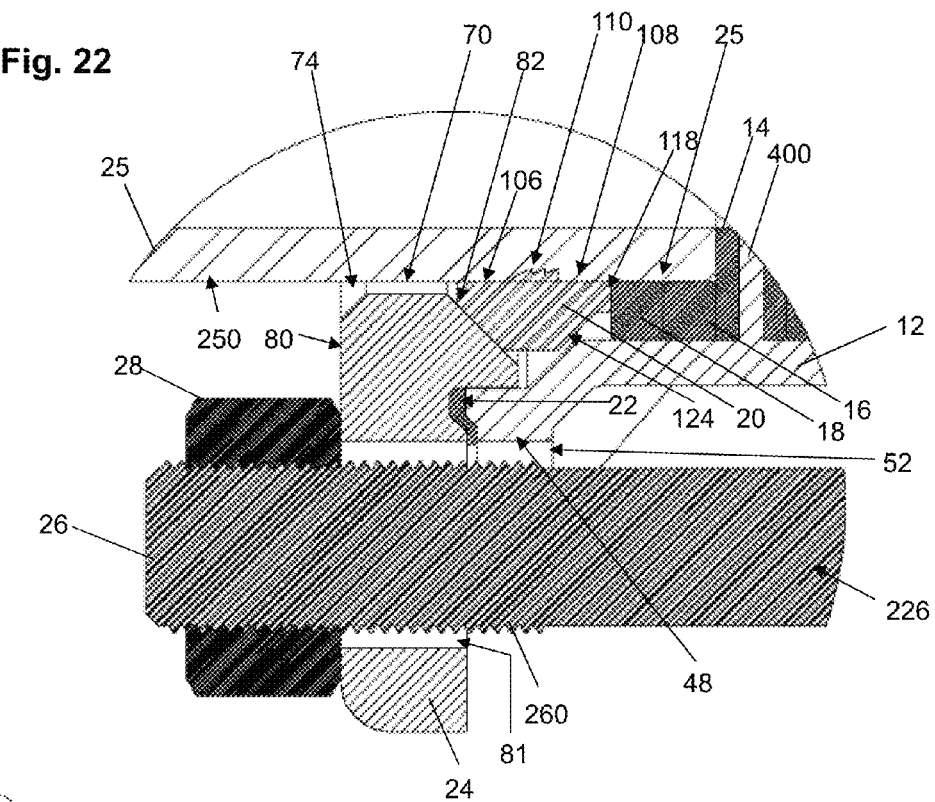
FIG. 22 is a view similar to FIG. 21, wherein the tubing members do not have annular grooves.
Figure 23:
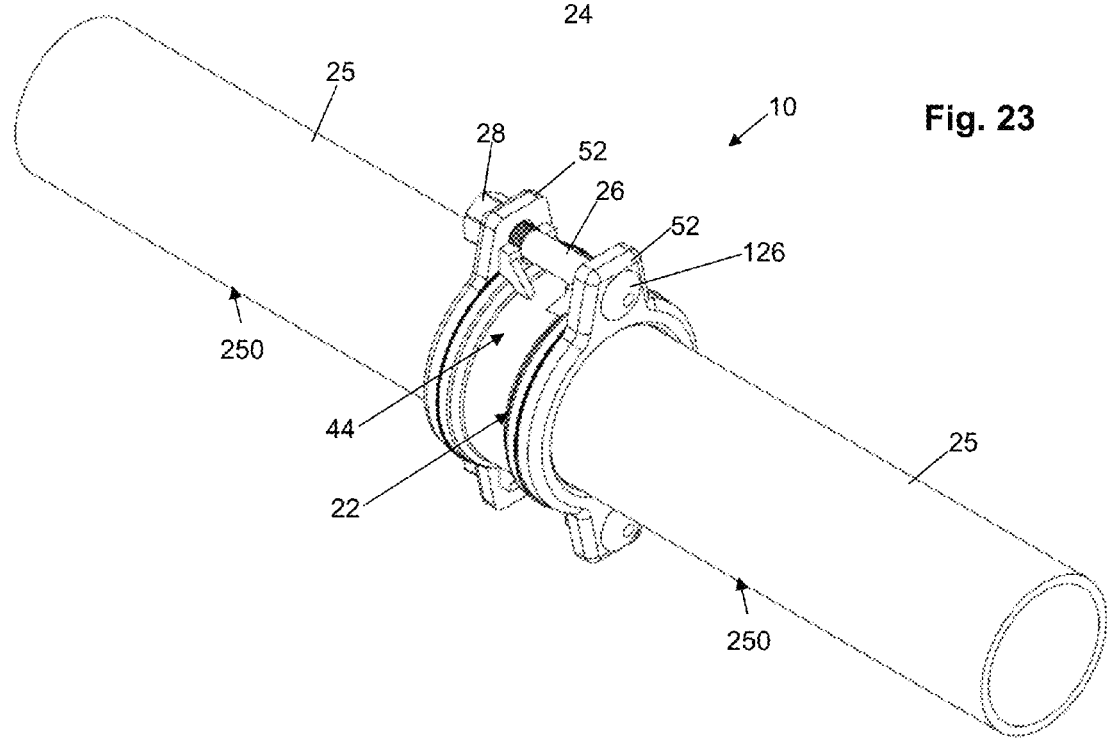
FIG. 23 is a perspective view of an installed packing arrangement with tubing members.
Figure 26:
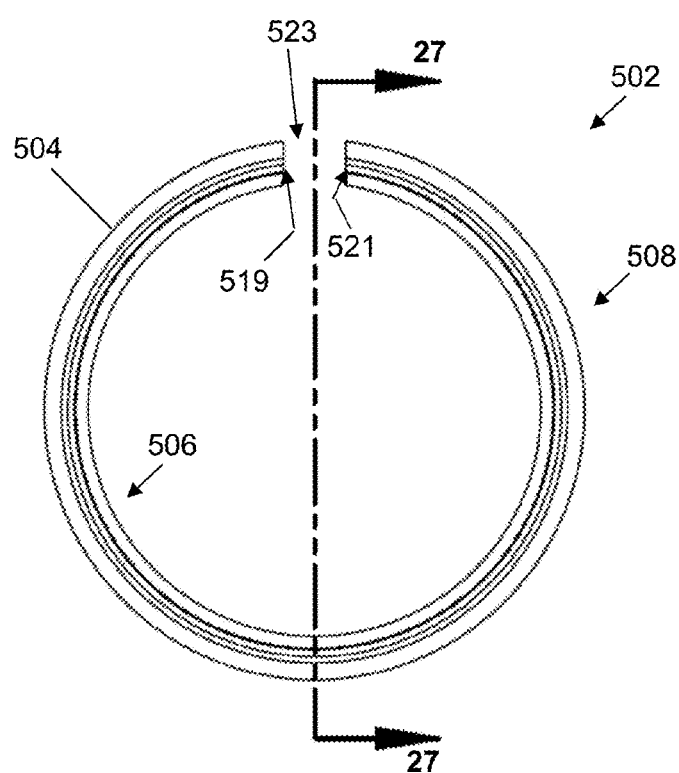
FIG. 26 is a right side view of an alternative shoe gland retainer according to embodiments of the present invention.
Figure 27:
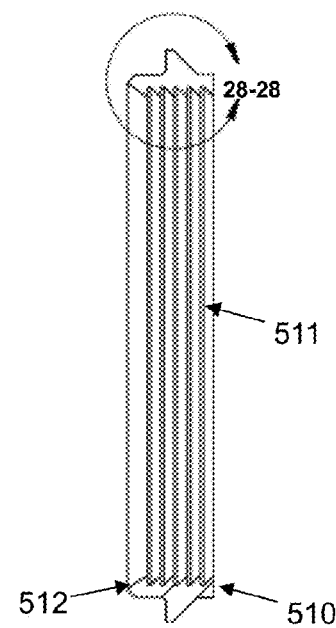
FIG. 27 is a cross-sectional view of the shoe gland retainer taken along line 27-27 of FIG. 26.
Figure 28:
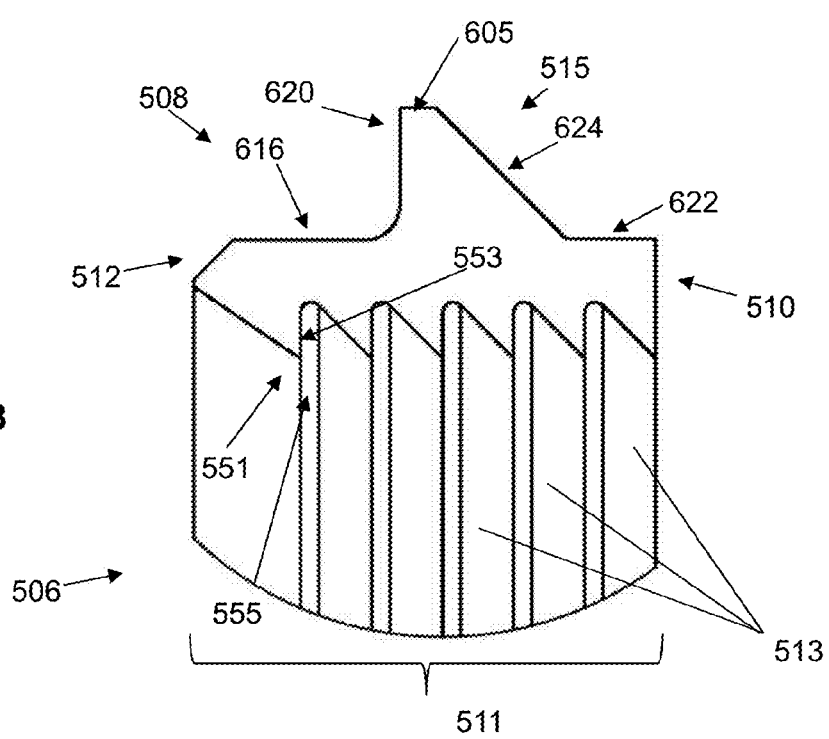
FIG. 28 is an enlarged view of encircled portion 28-28 of FIG. 27.

FIGS. 11 through 13 illustrate an exemplary embodiment of shoe gland and/or shoe gland retaining ring 20, which is configured to retain sealing members 14, 16 and 18 in the packing arrangement 11. As its geometry suggests, and as shown in FIGS. 19, 21 and 22, the shoe gland 20 can be configured to fit within center body connector 12 substantially at the sloped portion 49 and the axially inner portion 47 thereof. In particular, shoe gland 20 can comprise a substantially ring-shaped body 125 having a radially outer surface 105, an axially inner surface 118, an axially outer surface 116 and a radially inner surface 100. In various embodiments, the radially inner surface 100 is provided with an axially innermost surface 108, an axially outermost surface 106 and an interior gripping segment 110 between surfaces 106, 108 that is adapted to securely engage the outer surface 250 of an inserted pipe 25. As shown in FIGS. 21 and 23, surfaces 106, 108 and segment 110 can engage the outer surface 250 of pipe 25 during compression, and segment 110 is adapted to engage the annular ring 27 in any pipe 25 provided with such a feature. As shown in FIGS. 12 and 13, gripping segment 110 can comprise one or more gripping fin elements 119, each of which has a respective peak 114 and trough 112 to engage an inserted pipe 25 while providing resistance to any tendency for axially outward movement of the inserted pipe 25 when the packing assembly is compressed during operation. In various embodiments, segment 110 is formed such that each fin 119 has a peak 114 that is axially aligned with a respective trough 112 along a front wall 113. In a specific embodiment, a back wall 115 extends both radially and axially inwardly from the trough (e.g., 112a) immediately axially outward from a given peak (e.g., 114b) to the peak (e.g., 114b), which thereby provides additional force countering any inclination an inserted pipe 25 may have to back out of the opening 42 in the center body connector 12 when installed. The peaks 114 shown in FIGS. 11 through 13 are co-planar.

As shown in FIGS. 11 through 13, the shoe gland and/or shoe gland retaining ring 20 is formed with an axially inner surface 118 extending substantially radially for firm engagement with sealing ring member 18. Shoe gland can also be formed with an intermediate surface 124 and interior ridge 122 between the axially inner surface 118 and the radially outer surface 105, and the interior ridge 122 is formed so as to extend axially and removably engage axially inner portion 47 of the center body connector interior 40 during operation. The intermediate surface 124 extends axially and radially outwardly from interior ridge 122 to radially outer surface 105, and is formed so as to slidingly engage sloped portion 49 of the center body connector interior 40. Additionally, shoe gland 20 is formed with an outer sloped edge 120 extending axially inwardly and radially outwardly from the axially outer surface 116 and the radially outer surface 105, and the outer sloped edge 120 is adapted to slidingly engage the shoe engaging wall 82 of the retaining cap 24 during operation.

In various embodiments, shoe gland 20 can be formed as a unitary, monolithic body having various radially and axially extending surfaces adapted to engage other elements including a sealing ring, the center body connector, the retaining cap and the inserted pipe or tubing member, as shown and described. Shoe gland 20 can optionally be formed with a first circumferential end point 102 and a second circumferential end point 104 that do not connect and thereby form a slit 101, which allows the gland 20 to be manually pinched and compressed to facilitate installation into the center body connector 12.

FIGS. 26 through 51 illustrate alternative embodiments of the shoe gland retaining ring 20 shown in FIGS. 11 through 13. As shown, for example, in FIGS. 26 through 28, the shoe gland retaining ring 502 comprises a unitary, ring-shaped body 504 having radially inner 506 and outer 508 surfaces and axially inner 510 and outer 512 surfaces, wherein the radially inner surface 506 is provided with a gripping segment 511 comprising one or more fins 513, with each of the fins 513 extending radially inwardly. A wing 515 is also formed therewith, extending radially outwardly from the radial outer surface 508 to the radially outermost surface 605. The radial outer surface 508 is formed with an interior ridge 622 extending axially from the axially inner surface 510 to an intermediate surface 624, which extends radially and axially outwardly from the interior ridge 622 to the radially outermost surface 605. The radially outermost surface 605 extends in an axial direction. The radially outer surface 508 is further formed with an exterior ridge 616 extending axially inwardly from the axially outer surface 512 to a back wall 620, which extends radially outwardly from the exterior ridge 616 to the radially outermost surface 605. In various embodiments, the shoe gland retainer 502 can be split. The wing 515 engages the center body connector 12 and retaining cap 24 during operation, and in particular, the intermediate surface 624 of the wing 515 of the shoe gland 502 slidingly engages sloped portion 49 (see FIG. 6) of the interior surface 40 of the center body connector 12 during operation.

As shown, for example, in FIGS. 29 through 31, the shoe gland retaining ring 502 comprises a unitary, ring-shaped body 504 having radially inner 506 and outer 508 surfaces and axially inner 510 and outer 512 surfaces, wherein the radially inner surface 506 is provided with a series of staggered gripping segments 511 comprising one or more fins 513, with each of the fins 513 extending radially inwardly. A wing 515 is also formed therewith, extending radially outwardly from the radial outer surface 508 to the radially outermost surface 605. The radial outer surface 508 is formed with an interior ridge 622 extending axially from the axially inner surface 510 to an intermediate surface 624, which extends radially and axially outwardly from the interior ridge 622 to the radially outermost surface 605. The radially outermost surface 605 extends in an axial direction. The radially outer surface 508 is further formed with an exterior ridge 616 extending axially inwardly from the axially outer surface 512 to a back wall 620, which extends radially outwardly from the exterior ridge 616 to the radially outermost surface 605. The wing 515 engages the center body connector 12 and retaining cap 24 during operation, and in particular, the intermediate surface 624 of the wing 515 of the shoe gland 502 slidingly engages sloped portion 49 (see FIG. 6) of the interior surface 40 of the center body connector 12 during operation. In various embodiments, the shoe gland retainer 502 of FIGS. 29 through 31 can be split. Further, the wing 515 can extend around the entire outer circumference of the body 504, whereas the gripping segments 511 are staggered at intervals along the inner surface 506 of the body 504. In various embodiments, the gripping segments 511 each can extend along anywhere from approximately five degrees of the inner circumference of the body 504 to approximately ninety degrees of the inner circumference of the body 504. In a particular embodiment, the range of degree coverage of a gripping segment 511 is from approximately five degrees to approximately fifteen degrees.

Figure 32:
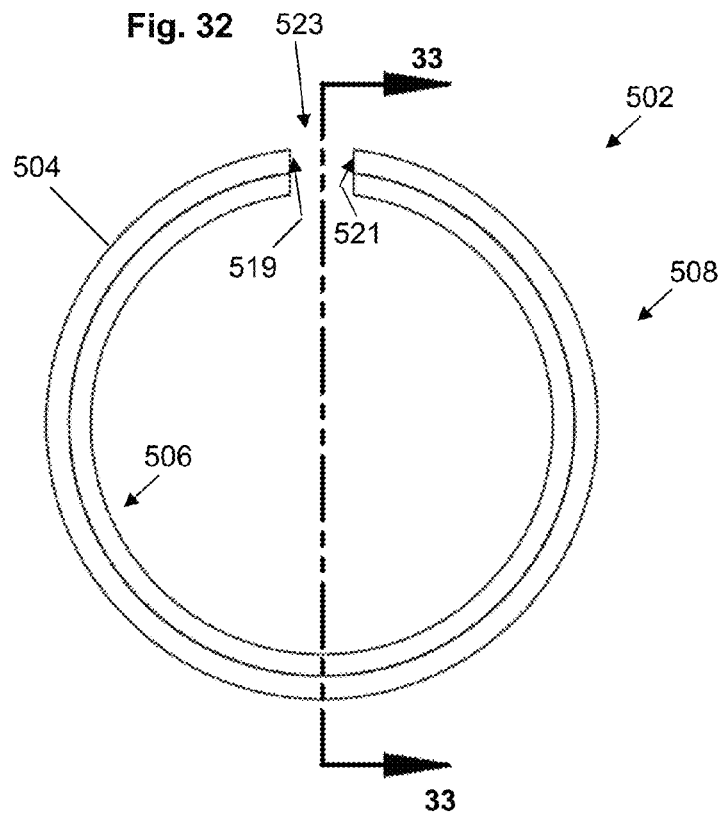
FIG. 32 is a right side view of an alternative shoe gland retainer according to embodiments of the present invention.
Figure 33:
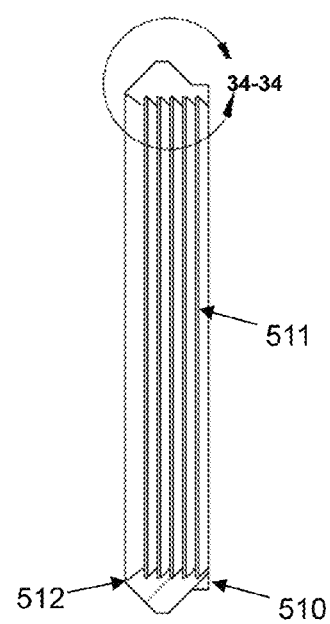
FIG. 33 is a cross-sectional view of the shoe gland retainer taken along line 33-33 of FIG. 32.
Figure 34:
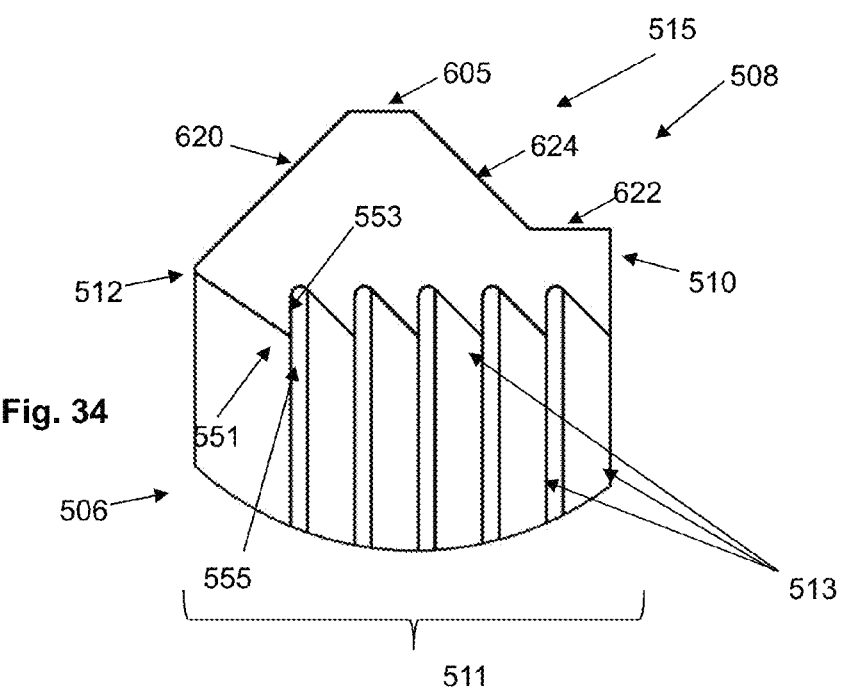
FIG. 34 is an enlarged view of encircled portion 34-34 of FIG. 33.

FIGS. 32 through 34 illustrate a further exemplary embodiment of the shoe gland retaining ring 502, which comprises a unitary, ring-shaped body 504 having radially inner 506 and outer 508 surfaces and axially inner 510 and outer 512 surfaces, wherein the radially inner surface 506 is provided with a gripping segment 511 comprising one or more fins 513, with each of the fins 513 extending radially inwardly. A wing 515 is also formed therewith, extending radially outwardly from the radial outer surface 508 to the radially outermost surface 605. The radial outer surface 508 is formed with an interior ridge 622 extending axially from the axially inner surface 510 to an intermediate surface 624, which extends radially and axially outwardly from the interior ridge 622 to the radially outermost surface 605. The radially outermost surface 605 extends in an axial direction. The radially outer surface 508 is further formed with a back wall 620, which extends radially outwardly and axially inwardly from the axially outer surface 512 to the radially outermost surface 605. In various embodiments, the shoe gland retainer 502 can be split. The wing 515 engages the center body connector 12 and retaining cap 24 during operation, and in particular, the intermediate surface 624 of the wing 515 of the shoe gland 502 slidingly engages sloped portion 49 (see FIG. 6) of the interior surface 40 of the center body connector 12 during operation.

FIGS. 35 through 37 illustrate a further exemplary embodiment of the shoe gland retaining ring 502, including a unitary, ring-shaped body 504 having radially inner 506 and outer 508 surfaces and axially inner 510 and outer 512 surfaces, wherein the radially inner surface 506 is provided with a series of staggered gripping segments 511 comprising one or more fins 513, with each of the fins 513 extending radially inwardly. A wing 515 is also formed therewith, extending radially outwardly from the radial outer surface 508 to the radially outermost surface 605. The radial outer surface 508 is formed with an interior ridge 622 extending axially from the axially inner surface 510 to an intermediate surface 624, which extends radially and axially outwardly from the interior ridge 622 to the radially outermost surface 605. The radially outermost surface 605 extends in an axial direction. The radially outer surface 508 is further formed with a back wall 620, which extends radially outwardly and axially inwardly from the axially outer surface 512 to the radially outermost surface 605. In various embodiments, the shoe gland retainer 502 can be split. The wing 515 engages the center body connector 12 and retaining cap 24 during operation, and in particular, the intermediate surface 624 of the wing 515 of the shoe gland 502 slidingly engages sloped portion 49 (see FIG. 6) of the interior surface 40 of the center body connector 12 during operation. Further, the wing 515 can extend around the outer circumference of the body 504, whereas the gripping segments 511 are staggered at intervals along the inner surface 506 of the body 504. In various embodiments, the gripping segments 511 each can extend along anywhere from approximately five degrees of the inner circumference of the body 504 to approximately ninety degrees of the inner circumference of the body 504. In a particular embodiment, the range of degree coverage of a gripping segment 511 is from approximately five degrees to approximately fifteen degrees.

FIGS. 38 through 41 illustrate a further exemplary embodiment of the shoe gland retaining ring 502, which comprises a unitary, ring-shaped body 504 having radially inner 506 and outer 508 surfaces and axially inner 510 and outer 512 surfaces, wherein the radially inner surface 506 is provided with a gripping segment 511 comprising one or more fins 513, with each of the fins 513 extending radially inwardly. A wing 515 is also formed therewith, extending radially outwardly from the radial outer surface 508 to the radially outermost surface 605. The radial outer surface 508 is formed with an interior ridge 622 extending axially from the axially inner surface 510 to an intermediate surface 624, which extends radially and axially outwardly from the interior ridge 622 to the radially outermost surface 605. The radially outermost surface 605 extends in an axial direction. The radially outer surface 508 is further formed with an exterior ridge 616 extending axially inwardly from the axially outer surface 512 to a back wall 620, which extends radially outwardly from the exterior ridge 616 to the radially outermost surface 605. In various embodiments, the shoe gland retainer 502 can be split. The wing 515 engages the center body connector 12 and retaining cap 24 during operation, and in particular, the intermediate surface 624 of the wing 515 of the shoe gland 502 slidingly engages sloped portion 49 (see FIG. 6) of the interior surface 40 of the center body connector 12 during operation. As shown in FIG. 41, the axially inward fins 503 extend radially inwardly further than the axially outer fins 505, which can assist in allowing fins 503 to engage an annular indentation such as 27 in pipe 25, whereas fins 505 engage the outer surface of pipe 25 during operation.

FIGS. 42 through 45 illustrate a further exemplary embodiment of the shoe gland retaining ring 502, including a unitary, ring-shaped body 504 having radially inner 506 and outer 508 surfaces and axially inner 510 and outer 512 surfaces, wherein the radially inner surface 506 is provided with a series of staggered gripping segments 511 comprising one or more fins 513, with each of the fins 513 extending radially inwardly. A wing 515 is also formed therewith, extending radially outwardly from the radial outer surface 508 to the radially outermost surface 605. The radial outer surface 508 is formed with an interior ridge 622 extending axially from the axially inner surface 510 to an intermediate surface 624, which extends radially and axially outwardly from the interior ridge 622 to the radially outermost surface 605. The radially outermost surface 605 extends in an axial direction. The radially outer surface 508 is further formed with an exterior ridge 616 extending axially inwardly from the axially outer surface 512 to a back wall 620, which extends radially outwardly from the exterior ridge 616 to the radially outermost surface 605. In various embodiments, the shoe gland retainer 502 can be split. The wing 515 engages the center body connector 12 and retaining cap 24 during operation, and in particular, the intermediate surface 624 of the wing 515 of the shoe gland 502 slidingly engages sloped portion 49 (see FIG. 6) of the interior surface 40 of the center body connector 12 during operation. As shown in FIG. 45, the axially inward fins 503 extend radially inwardly further than the axially outer fins 505, which can assist in allowing fins 503 to engage an annular indentation such as 27 in pipe 25, whereas fins 505 engage the outer surface of pipe 25 during operation. Further, the wing 515 can extend around the outer circumference of the body 504, whereas the gripping segments 511 are staggered at intervals along the inner surface 506 of the body 504. In various embodiments, the gripping segments 511 each can extend along anywhere from approximately five degrees of the inner circumference of the body 504 to approximately ninety degrees of the inner circumference of the body 504. In a particular embodiment, the range of degree coverage of a gripping segment 511 is from approximately five degrees to approximately fifteen degrees.

FIGS. 46 through 48 illustrate a further exemplary embodiment of the shoe gland retaining ring 502, which comprises a unitary, ring-shaped body 504 having radially inner 506 and outer 508 surfaces and axially inner 510 and outer 512 surfaces, wherein the radially inner surface 506 is provided with a gripping segment 511 comprising first 542 and second 544 fins, with each of the fins extending radially inwardly. A wing 515 is also formed therewith, extending radially outwardly from the radial outer surface 508 to the radially outermost surface 605. The radial outer surface 508 is formed with an interior ridge 622 extending axially from the axially inner surface 510 to an intermediate surface 624, which extends radially and axially outwardly from the interior ridge 622 to the radially outermost surface 605. The radially outermost surface 605 extends in an axial direction. The radially outer surface 508 is further formed with an exterior ridge 616 extending axially inwardly from the axially outer surface 512 to a back wall 620, which extends radially outwardly from the exterior ridge 616 to the radially outermost surface 605. In various embodiments, the shoe gland retainer 502 can be split. The wing 515 engages the center body connector 12 and retaining cap 24 during operation, and in particular, the intermediate surface 624 of the wing 515 of the shoe gland 502 slidingly engages sloped portion 49 (see FIG. 6) of the interior surface 40 of the center body connector 12 during operation. As shown in FIG. 48, the first fin 542 extends radially inwardly a shorter distance than second fin 544, and the first fin 542 has a shorter axial width than second fin 544. In operation, the second fin edge 565 will engage the pipe outer surface 250 first upon compression, and can effectively dig into the pipe outer wall in order to securely retain the pipe. As the packing arrangement is further compressed, the first fin edge 563 will contact the pipe outer surface 250 to form a type of wedge. Should the pipe seek to move or escape axially outwardly of the fitting interior, the wedge formed by the fins 542 and 544 will flex about a hinge edge 569, which forces first fin edge 563 further into the pipe outer surface 250 to provide additional retaining strength for retaining the pipe within the fitting cavity.

FIGS. 49 through 51 illustrate a further exemplary embodiment of the shoe gland retaining ring 502, including a unitary, ring-shaped body 504 having radially inner 506 and outer 508 surfaces and axially inner 510 and outer 512 surfaces, wherein the radially inner surface 506 is provided with a series of staggered gripping segments 511 comprising first 542 and second 544 fins, with each of the fins 542, 544 extending radially inwardly. A wing 515 is also formed therewith, extending radially outwardly from the radial outer surface 508 to the radially outermost surface 605. The radial outer surface 508 is formed with an interior ridge 622 extending axially from the axially inner surface 510 to an intermediate surface 624, which extends radially and axially outwardly from the interior ridge 622 to the radially outermost surface 605. The radially outermost surface 605 extends in an axial direction. The radially outer surface 508 is further formed with an exterior ridge 616 extending axially inwardly from the axially outer surface 512 to a back wall 620, which extends radially outwardly from the exterior ridge 616 to the radially outermost surface 605. In various embodiments, the shoe gland retainer 502 can be split. The wing 515 engages the center body connector 12 and retaining cap 24 during operation, and in particular, the intermediate surface 624 of the wing 515 of the shoe gland 502 slidingly engages sloped portion 49 (see FIG. 6) of the interior surface 40 of the center body connector 12 during operation. As shown in FIG. 48, the first fin 542 extends radially inwardly a shorter distance than second fin 544, and the first fin 542 has a shorter axial width than second fin 544. Further, the wing 515 can extend around the outer circumference of the body 504, whereas the gripping segments 511 are staggered at intervals along the inner surface 506 of the body 504. In various embodiments, the gripping segments 511 each can extend along anywhere from approximately five degrees of the inner circumference of the body 504 to approximately ninety degrees of the inner circumference of the body 504. In a particular embodiment, the range of degree coverage of a gripping segment 511 is from approximately five degrees to approximately fifteen degrees.

In various embodiments of the present invention, the shoe gland (a.k.a., shoe gland retaining ring) 20 and/or 502 can comprise a metal or plastic component, and can be provided as a unitary, unsplit member or can be provided with a split as describe above. In the above-described embodiments of the shoe gland retainer 502 where the retainer is split, the body 504 includes first 519 and second 521 circumferential end points forming the split 523. In various embodiments, the split nature of the shoe gland retaining ring 20 and/or 502 allows it to compress and/or collapse during tightening engagement of bolt 26 and nut 28, effectively narrowing the split. During such operation, the diameter of the body when compressed becomes less than the diameter of the body when at rest. As the bolt/nut connection is loosened, the shoe gland retaining ring 20 and/or 502 expands and re-forms back into its relaxed, original state, reducing the compression of the packing arrangement on the inserted pipe 25.

Further, in the above-described embodiments, each fin 513 can include a first wall 551 extending axially inwardly and a second wall 553 that does not extend axially in either direction as in FIGS. 28, 31, 34 and 37, or that extends axially outwardly, as in FIGS. 41 and 45. Walls 551 and 553 meet at a fin edge 555. In the embodiments shown in FIGS. 26 through 28, 32 through 34, 38 through 41 and 46 through 48, each fin extends continuously around the radially inner surface of the body. Further, in the embodiments of shoe gland retainer 502 shown in FIGS. 26 through 45, the gripping segment 511 extends substantially across the entire axial length of the radially inner surface 506, whereas in FIGS. 46-51, the gripping segment 511 extends only across a central portion of the radially inner surface 506.

In various embodiments, fin 542 in FIGS. 46 through 51 includes a first wall 560 that does not extend axially in either direction, and a second wall 562 that extends axially outwardly, wherein the walls 560, 562 meet at a fin edge 563. Fin 544 in FIGS. 46 through 51 has first 564 and second 566 walls that both extend axially inwardly. In various embodiments, the first wall 564 extends axially inwardly from the radially inner surface of the body at a primary wall angle, and the second wall 566 extends inwardly from the radially inner surface 506 of the body 504 at a secondary wall angle, and wherein the primary and secondary walls meet at a second fin edge 565. In various embodiments, the secondary wall angle from the inner surface 506 is greater than the primary wall angle from the inner surface 506.

As shown in FIGS. 14 and 15, an indicator ring 22 is provided that is adapted to extend radially outwardly of the outer surface of the joined retaining cap 24 and center body connector 12 under pressure, to provide a visual indicator that sufficient connective pressure has been applied for the seal to operate properly. The indicator ring 22 can comprise a membrane of low density rubber that is flexible, resilient and displaceable under pressure, and can be of a special distinctive color to facilitate visual inspection as described elsewhere herein. As shown in FIGS. 14 and 15, the indicator ring 22 includes surfaces that provide structure to support interoperation, connection and engaged movement with other surfaces of other components of the present invention, as shown and described herein. For instance, indicator ring 22 has a radially interior surface 130 and radially exterior surface 132, and further includes an axially exterior surface 134 and axially interior surface 136. As shown in FIGS. 21 and 23, axially exterior surface 134 engages notch portion 63 of retaining cap 24, and axially exterior surface 132 engages the radially extending edge 55, beveled wall segment 53 and axial end wall segment 150 of center body connector 12. Further, the radially interior surface 130 of the indicator ring 22 engages the radially inner segment 85 of the ledge 65 of the retaining cap 24. The radially exterior surface 132 either engages the bolt 26 at a position along the outer circumference of the center body connector 12 adjacent the retaining cap 24, or is exposed to the open environment. When displaced under pressure by adjacent parts, the flexible indicator ring 22 is adapted to protrude radially outwardly beyond and adjacent the axial end wall segment 50 and/or 150 of the center body connector 12.

FIGS. 16 and 17 illustrate embodiments of sealing member 14, which can comprise a flat ring or washer-type seal member in addition to or as an alternative to a circular member of substantially circular cross-section, such as sealing members 16, 18. In various embodiments, the sealing elements 14, 16, 18 can be formed from a rubber or similar compressible material and can be lubricated with a food grade lubricant, for example. In various embodiments, the sealing members 14, 16, 18 or a subset thereof can be integrated and formed as a single, unitary monolithic sealing element having a substantially similar shape and geometry to the combined individual elements 14, 16, 18 shown in FIGS. 1, 2, 19, 21 and 23. As shown in FIGS. 16 and 17, sealing member 14 includes an inner surface 140, an outer surface 142, and a first side wall surface 144 opposed from a second side wall surface 146. The first side wall surface 144 is adapted to engage sealing member 16 and an inserted pipe 25 during operation, while the second side wall surface 146 is adapted to engage side wall surface 43 of flange 400 during operation. Further, the radial distance to inner surface 140 is substantially equivalent to the internal radius of the piping element(s) 25 being connected, thereby enabling a seamless connection between the pipe(s) 25 from the perspective of fluids, etc., traveling within pipe(s) 25. Additionally, the outer surface 142 is adapted to engage the interior surface 40 of center body connector 12 at the axially inner portion 47 thereof.

Bolt element 26 is provided with head 126, body 226, threaded outer surface 260 and tip 236, wherein the outer surface 260 engages the internal thread 280 of a corresponding nut member 28, after proceeding through the opening 81 of the retaining cap 24 and the U-shaped guide 56 of the center body connector 12. Bolt element 26 can further include an adapted head 126 having a flat head groove or "Philips head" groove for ease of operation. It will be appreciated that the axial compression force of rotating the bolt 26 so that it engages the nut 28 translates into axial and radial compression of the packing arrangement 11 to create a tight seal. A similar procedure can be employed for the corresponding pipe on the opposite side of connector. Once tightened, a leak proof, sealed connection is established.

In assembly and operation, and with reference to FIGS. 18 through 23, the center body connector 12 is provided, having one or more sealing members 14, 16, 18 and shoe gland 20 installed therein. The indicator ring 22 can optionally be positioned as shown and described above. A user can then install retaining cap 24 onto one end of a pipe 25 to be connected. The pipe 25 can then be inserted into one side of center body connector 20 up to the tube stop and/or flange 400 with no resistance. The packing arrangement 11 can appear, for example, as shown in FIGS. 18 and 19. As can be seen therein, sealing elements 16, 18 are not yet compressed, and the shoe gland 20 is not in mating contact with piping element 25 or its optional annular groove 27. Bolts 26 are then inserted through respective openings 81 in the retaining cap 24 and respective guides 56 of the center body connector blocks 52, and are engaged with respective nut members 28. As the nut members 28 and bolt members 26 are tightened together, the retaining cap 24 is pulled axially toward the center body connector 12, such that the radially inner segment 85 of the ledge 65 (see FIG. 10) of the retaining cap 24 slidingly engages axially outer portion 39 (see FIG. 6) of interior surface 40 of center body connector, shoe engaging wall 82 of retaining cap 24 slidingly engages the outer sloped edge 120 of the shoe gland 20, and the intermediate surface 124 of the shoe gland 20 slidingly engages sloped portion 49 (see FIG. 6) of the interior surface 40 of the center body connector 12. Such action causes axially inner surface 118 of the shoe gland 20 to engage the axially outer surface of sealing member 18, which thereby compresses sealing members 14, 16 and 18, as shown in FIGS. 21 and 22. Such action further causes gripping segment 110 of shoe gland 20 to engage the exterior surface 250 of the inserted piping element 25. This engagement can be within the notch 27 of the pipe 25 as shown in FIG. 21, or directly on the outer surface 250 of the pipe 25 as shown in FIG. 22. In FIGS. 21 and 22, radially outermost surface 106 and radially innermost surface 108 of the shoe gland 20 also engage the outer surface 250 of the pipe 25. Further, as the nut members 28 and bolt members 26 are tightened together, the indicator ring 22, which is retained in the resting position within the retaining cap notch 63 as shown in FIG. 19, is compressed by the axial end wall segment 50 of the center body connector 12, and thereby expands radially outwardly between first segment 87 and face 67 of the retaining cap 24 and beveled wall segment 53 and radially extending edge 55 of the center body connector 12, as shown in FIG. 21. When the retaining cap 24 and center body connector 12 are properly engaged, the indicator ring 22 is compressed and caused to extend radially outwardly of the joint between the retaining cap 24 and center body connector 12, adjacent axially outer segment 48 of the center body connector 12, as shown in FIGS. 21 and 22. In this way, indicator ring 22 provides a visual and tactile indicator around the circumference of the joint device that the device has been properly sealed, as indicated in FIG. 23.

It will be appreciated that the axial compression force of tightening the bolt member and nut connector translates into axial and radial compression of the packing arrangement to create a tight seal. The inserted pipe 25 is effectively drawn inward by the compression of the packing arrangement, which pulls the pipe 25 onto the sealing member 14 between the pipe end wall 255 and the side wall surface 144 of sealing member 14. A similar procedure can be employed for the corresponding pipe 25 on the opposite side of connector 20. Once tightened, a leak proof, sealed connection is established. The arrangement as described is also self-aligning. For example, as the pipe 25 is inserted into the packing arrangement, the retaining cap 24 moves the shoe gland 20 axially inwardly and radially inwardly which, along with sealing members 16, 18 increasingly contacts the inserted pipe 25 and continually increases the seal so as to center and align the pipe within the axial cavity of the center body connector 12. In the event a user desires to disconnect the coupled pipes 25, the process may simply be reversed, allowing for clean, easy access to the interior of the pipe 25. If desired, the pipes 25 could then be re-connected using the same procedure and parts.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A shoe gland retaining ring for a fitting, comprising:
a unitary, ring-shaped body having radially inner and outer surfaces and axially inner and outer surfaces, wherein the radially inner surface is provided with a plurality of internal fins spaced axially apart along the radially inner surface, each of the plurality of internal fins extending radially inwardly when uncompressed, and wherein the body includes first and second circumferential end points forming a split in the body; and
a wing extending radially outwardly from the radial outer surface between the axially inner and outer surfaces, wherein the radial outer surface is formed with an interior ridge extending axially from the axially inner surface to the wing, and wherein the wing includes an intermediate surface extending radially and axially outwardly from the interior ridge to a radially outermost surface of the radial outer surface.

2. The retaining ring of claim 1, wherein each fin has a first wall extending axially inwardly and a second wall extending axially outwardly, and wherein the first and second walls meet at a fin edge.

3. The retaining ring of claim 2, wherein at least a first one of the plurality of fins has a first fin edge and at least a second one of the plurality of fins has a second fin edge, and wherein the first fin edge lies radially inwardly further than the second fin edge.

4. The retaining ring of claim 1, wherein each fin has a first wall that extends radially inwardly from the radially inner surface of the body and a second wall that extends axially and radially inwardly from the radially inner surface of the body, and wherein the first and second walls meet at a fin edge.

5. The retaining ring of claim 1, wherein a first fin has a first wall that extends radially inwardly from the radially inner surface of the body and a second wall that extends axially outwardly and radially inwardly from the radially inner surface of the body, and wherein the first and second walls meet at a first fin edge.

6. The retaining ring of claim 5, wherein a second fin has a primary wall that extends axially inwardly from the radially inner surface of the body at a primary wall angle, and wherein the second fin has a secondary wall that extends inwardly from the radially inner surface of the body at a secondary wall angle, and wherein the primary and secondary walls meet at a second fin edge.

7. The retaining ring of claim 6, wherein the second fin edge extends radially inwardly further than the first fin edge.

8. The retaining ring of claim 6, wherein the secondary wall angle is greater than the primary wall angle.

9. The retaining ring of claim 1, wherein each fin extends continuously around the radially inner surface of the body.

10. The retaining ring of claim 1, wherein the plurality of fins comprise at least one set of fins that extends along a portion but not the entirety of the radially inner surface of the body.

11. The retaining ring of claim 10, including a plurality of sets of fins, wherein each of the sets of fins extends along a portion but not the entirety of the radially inner surface of the body.

12. The retaining ring of claim 11, wherein each of the sets of fins extends from approximately five degrees to approximately ninety degrees along the circumference of the radially inner surface of the body.

13. The retaining ring of claim 11, wherein each of the sets of fins extends from approximately five degrees to approximately fifteen degrees along the circumference of the radially inner surface of the body.

14. The retaining ring of claim 1, wherein the wing is integrally formed with the body such that the retainer is of a unitary construction.

15. The retaining ring of claim 1, wherein the radially outer surface is further formed with an exterior ridge extending axially inwardly from the axially outer surface, wherein the wing is formed with a back wall extending radially outwardly from the exterior ridge to the radially outermost surface.

16. The retaining ring of claim 1, wherein the wing is formed with a back wall extending radially outwardly and axially inwardly of the radially outer surface of the body.

17. The retaining ring of claim 1, wherein the radial inner surface has an axial length, and wherein the plurality of internal fins comprise a gripping segment that extends across the axial length of the radially inner surface.

18. A shoe gland retaining ring for a fitting, comprising:
a unitary, ring-shaped body having radially inner and outer surfaces and axially inner and outer surfaces, wherein the radially inner surface is provided with a plurality of internal fins, each of the plurality of internal fins extending radially inwardly, and wherein the body has a resting diameter and is collapsible to a position where the body has a compressed diameter that is smaller than the resting diameter; and
a wing extending radially outwardly from the radial outer surface between the axially inner and outer surfaces, wherein the radial outer surface is formed with an interior ridge extending axially from the axially inner surface to the wing, and wherein the wing includes an intermediate surface extending radially and axially outwardly from the interior ridge to a radially outermost surface of the radial outer surface, wherein a first fin has a first wall that extends radially inwardly from the radially inner surface of the body and does not extend axially in either direction, wherein the first fin further includes a second wall that extends axially outwardly and radially inwardly from the radially inner surface of the body, and wherein the first and second walls meet at a first fin edge, wherein a second fin has first and second walls that extend axially inwardly from the radially inner surface of the body, and wherein the first and second walls meet at a second fin edge, and further wherein the second fin edge lies radially inward of the first fin edge.

* * * * *